US012761773B2

(12) United States Patent
Bhullar et al.

(10) Patent No.: US 12,761,773 B2
(45) Date of Patent: Oct. 13, 2026

(54) TECHNIQUES FOR MANAGING A LIST OF ITEMS

(71) Applicant: Apple Inc., Cupertino, CA (US)

(72) Inventors: Bicrumjit S. Bhullar, San Jose, CA (US); Kian Boon Sebastian Ng, Cupertino, CA (US); Dongning Wang, San Jose, CA (US)

(73) Assignee: APPLE INC., Cupertino, CA (US)

( * ) Notice: Subject to any disclaimer, the term of this patent is extended or adjusted under 35 U.S.C. 154(b) by 211 days.

(21) Appl. No.: 18/643,146

(22) Filed: Apr. 23, 2024

(65) Prior Publication Data

US 2024/0402882 A1 Dec. 5, 2024

Related U.S. Application Data

(60) Provisional application No. 63/470,975, filed on Jun. 4, 2023.

(51) Int. Cl.
*G06F 3/0482* (2013.01)
*G06F 3/0484* (2022.01)

(52) U.S. Cl.
CPC .......... *G06F 3/0482* (2013.01); *G06F 3/0484* (2013.01)

(58) Field of Classification Search
CPC .............................. G06F 3/0482; G06F 3/0484
See application file for complete search history.

(56) References Cited

U.S. PATENT DOCUMENTS

| | | | | |
|---|---|---|---|---|
| 6,323,846 | B1 | 11/2001 | Westerman et al. | |
| 6,570,557 | B1 | 5/2003 | Westerman et al. | |
| 6,677,932 | B1 | 1/2004 | Westerman | |
| 7,614,008 | B2 | 11/2009 | Ording | |
| 7,633,076 | B2 | 12/2009 | Huppi et al. | |
| 7,653,883 | B2 | 1/2010 | Hotelling et al. | |
| 7,657,849 | B2 | 2/2010 | Chaudhri et al. | |
| 7,663,607 | B2 | 2/2010 | Hotelling et al. | |
| 7,844,914 | B2 | 11/2010 | Andre et al. | |
| 7,957,762 | B2 | 6/2011 | Herz et al. | |
| 8,006,002 | B2 | 8/2011 | Kalayjian et al. | |
| 8,239,784 | B2 | 8/2012 | Hotelling et al. | |
| 8,279,180 | B2 | 10/2012 | Hotelling et al. | |
| 8,381,135 | B2 | 2/2013 | Hotelling et al. | |
| 8,479,122 | B2 | 7/2013 | Hotelling et al. | |
| 8,838,603 | B1 * | 9/2014 | Djabarov | G06F 16/9538 707/737 |
| 9,348,458 | B2 | 5/2016 | Hotelling et al. | |
| 9,501,551 | B1 * | 11/2016 | Weissgerber | G06Q 30/0282 |
| 9,933,937 | B2 | 4/2018 | Lemay et al. | |
| 9,946,790 | B1 * | 4/2018 | Siegel | G06F 16/355 |
| 10,528,907 | B2 * | 1/2020 | Pobbathi | G06Q 10/087 |
| 10,621,208 | B2 * | 4/2020 | Chung | G06Q 30/0625 |
| 11,275,405 | B2 | 3/2022 | Hotelling | |
| 2002/0015024 | A1 | 2/2002 | Westerman et al. | |

(Continued)

FOREIGN PATENT DOCUMENTS

| | | | |
|---|---|---|---|
| WO | WO 2013/169849 | A2 | 11/2013 |
| WO | WO 2014/105276 | A1 | 7/2014 |

OTHER PUBLICATIONS

U.S. Appl. No. 60/936,562, filed Jun. 20, 2007.

*Primary Examiner* — Mahelet Shiberou
(74) *Attorney, Agent, or Firm* — Kyle B. Morse; BAKERHOSTETLER LLP

(57) ABSTRACT

The present disclosure generally relates to managing a list of items.

45 Claims, 18 Drawing Sheets

(56) References Cited

U.S. PATENT DOCUMENTS

| | | | | |
|---|---|---|---|---|
| 2005/0190059 | A1 | 9/2005 | Wehrenberg | |
| 2006/0017692 | A1 | 1/2006 | Wehrenberg et al. | |
| 2006/0033724 | A1 | 2/2006 | Chaudhri et al. | |
| 2012/0041831 | A1* | 2/2012 | Ruvini | G06Q 30/0601<br>705/26.1 |
| 2014/0351094 | A1* | 11/2014 | Umeda | G06Q 30/0641<br>705/26.62 |
| 2016/0283580 | A1* | 9/2016 | Amacker | G06F 16/9535 |
| 2018/0088788 | A1* | 3/2018 | Cheung | G06F 40/137 |
| 2019/0327356 | A1* | 10/2019 | Ye | H04M 1/72403 |
| 2020/0364773 | A1* | 11/2020 | Pal | G06F 3/0484 |
| 2021/0358012 | A1* | 11/2021 | Liu | G06Q 30/0631 |
| 2023/0185769 | A1* | 6/2023 | Lichtenberg | G06F 16/168<br>707/821 |
| 2023/0289868 | A1* | 9/2023 | Bender | G06N 5/022 |
| 2024/0403559 | A1* | 12/2024 | Bhullar | G06F 16/906 |

* cited by examiner

TECHNIQUES FOR MANAGING A LIST OF ITEMS

CROSS-REFERENCE TO RELATED APPLICATIONS

The present application claims priority to U.S. Provisional Patent Application Ser. No. 63/470,975, entitled "TECHNIQUES FOR MANAGING A LIST OF ITEMS" filed Jun. 4, 2023, which is hereby incorporated by reference in its entirety for all purposes.

FIELD

The present disclosure relates generally to computer user interfaces, and more specifically to techniques for managing a list of items.

BACKGROUND

Electronic devices often display lists of items. Such lists can become unmanageable as the number of items grow.

SUMMARY

Some techniques for managing a list of items using electronic devices are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing a list of items. Such methods and interfaces optionally complement or replace other methods for managing a list of items. Such methods and interfaces reduce the cognitive burden on a user and produce a more efficient human-machine interface. For battery-operated computing devices, such methods and interfaces conserve power and increase the time between battery charges.

In some examples, a method that is performed at a computer system that is in communication with a display generation component and one or more input devices is described. In some examples, the method comprises: displaying, via the display generation component, a list of items, wherein the list of items includes: one or more items assigned to a first category; and one or more items assigned to a second category different from the first category; while displaying, via the display generation component, the list of items, detecting, via the one or more input devices, a first set of one or more inputs corresponding to a request to add a first new item to a third category; in response to detecting the first set of one or more inputs: updating, via the display generation component, display of the list of items to include the first new item in the third category; and in accordance with a determination that a first set of one or more criteria is satisfied, displaying, via the display generation component, a control corresponding to the first new item; while displaying the control corresponding to the first new item, detecting a second set of one or more inputs corresponding to selection of the control; and in response to detecting the second set of one or more inputs, updating, via the display generation component, display of the list of items to include the first new item in a fourth category different from the third category without including the first new item in the third category.

In some examples, a non-transitory computer-readable storage medium storing one or more programs configured to be executed by one or more processors of a computer system that is in communication with a display generation component and one or more input devices is described. In some examples, the one or more programs includes instructions for: displaying, via the display generation component, a list of items, wherein the list of items includes: one or more items assigned to a first category; and one or more items assigned to a second category different from the first category; while displaying, via the display generation component, the list of items, detecting, via the one or more input devices, a first set of one or more inputs corresponding to a request to add a first new item to a third category; in response to detecting the first set of one or more inputs: updating, via the display generation component, display of the list of items to include the first new item in the third category; and in accordance with a determination that a first set of one or more criteria is satisfied, displaying, via the display generation component, a control corresponding to the first new item; while displaying the control corresponding to the first new item, detecting a second set of one or more inputs corresponding to selection of the control; and in response to detecting the second set of one or more inputs, updating, via the display generation component, display of the list of items to include the first new item in a fourth category different from the third category without including the first new item in the third category.

In some examples, a transitory computer-readable storage medium storing one or more programs configured to be executed by one or more processors of a computer system that is in communication with a display generation component and one or more input devices is described. In some examples, the one or more programs includes instructions for: displaying, via the display generation component, a list of items, wherein the list of items includes: one or more items assigned to a first category; and one or more items assigned to a second category different from the first category; while displaying, via the display generation component, the list of items, detecting, via the one or more input devices, a first set of one or more inputs corresponding to a request to add a first new item to a third category; in response to detecting the first set of one or more inputs: updating, via the display generation component, display of the list of items to include the first new item in the third category; and in accordance with a determination that a first set of one or more criteria is satisfied, displaying, via the display generation component, a control corresponding to the first new item; while displaying the control corresponding to the first new item, detecting a second set of one or more inputs corresponding to selection of the control; and in response to detecting the second set of one or more inputs, updating, via the display generation component, display of the list of items to include the first new item in a fourth category different from the third category without including the first new item in the third category.

In some examples, a computer system that is in communication with a display generation component and one or more input devices is described. In some examples, the computer system comprises one or more processors and memory storing one or more programs configured to be executed by the one or more processors. In some examples, the one or more programs includes instructions for: displaying, via the display generation component, a list of items, wherein the list of items includes: one or more items assigned to a first category; and one or more items assigned to a second category different from the first category; while displaying, via the display generation component, the list of items, detecting, via the one or more input devices, a first set of one or more inputs corresponding to a request to add a first new item to a third category; in response to detecting the first set of one or more inputs: updating, via the display generation component, display of the list of items to include the first new item in the third category; and in accordance with a determination that a first set of one or more criteria is satisfied, displaying, via the display generation component, a control corresponding to the first new item; while displaying the control corresponding to the first new item, detecting a second set of one or more inputs corresponding to selection of the control; and in response to detecting the second set of one or more inputs, updating, via the display generation component, display of the list of items to include the first new item in a fourth category different from the third category without including the first new item in the third category.

In some examples, a computer system that is in communication with a display generation component and one or more input devices is described. In some examples, the computer system comprises means for performing each of the following steps: displaying, via the display generation component, a list of items, wherein the list of items includes: one or more items assigned to a first category; and one or more items assigned to a second category different from the first category; while displaying, via the display generation component, the list of items, detecting, via the one or more input devices, a first set of one or more inputs corresponding to a request to add a first new item to a third category; in response to detecting the first set of one or more inputs: updating, via the display generation component, display of the list of items to include the first new item in the third category; and in accordance with a determination that a first set of one or more criteria is satisfied, displaying, via the display generation component, a control corresponding to the first new item; while displaying the control corresponding to the first new item, detecting a second set of one or more inputs corresponding to selection of the control; and in response to detecting the second set of one or more inputs, updating, via the display generation component, display of the list of items to include the first new item in a fourth category different from the third category without including the first new item in the third category.

In some examples, a computer program product is described. In some examples, the computer program product comprises one or more programs configured to be executed by one or more processors of a computer system that is in communication with a display generation component and one or more input devices. In some examples, the one or more programs include instructions for: displaying, via the display generation component, a list of items, wherein the list of items includes: one or more items assigned to a first category; and one or more items assigned to a second category different from the first category; while displaying, via the display generation component, the list of items, detecting, via the one or more input devices, a first set of one or more inputs corresponding to a request to add a first new item to a third category; in response to detecting the first set of one or more inputs: updating, via the display generation component, display of the list of items to include the first new item in the third category; and in accordance with a determination that a first set of one or more criteria is satisfied, displaying, via the display generation component, a control corresponding to the first new item; while displaying the control corresponding to the first new item, detecting a second set of one or more inputs corresponding to selection of the control; and in response to detecting the second set of one or more inputs, updating, via the display generation component, display of the list of items to include the first new item in a fourth category different from the third category without including the first new item in the third category.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing lists of items, thereby increasing the effectiveness, efficiency, and user satisfaction with such devices. Such methods and interfaces may complement or replace other methods for managing lists of items.

DESCRIPTION OF THE FIGURES

For a better understanding of the various described embodiments, reference should be made to the Detailed Description below, in conjunction with the following drawings in which like reference numerals refer to corresponding parts throughout the figures.

DETAILED DESCRIPTION

Figure 1A:
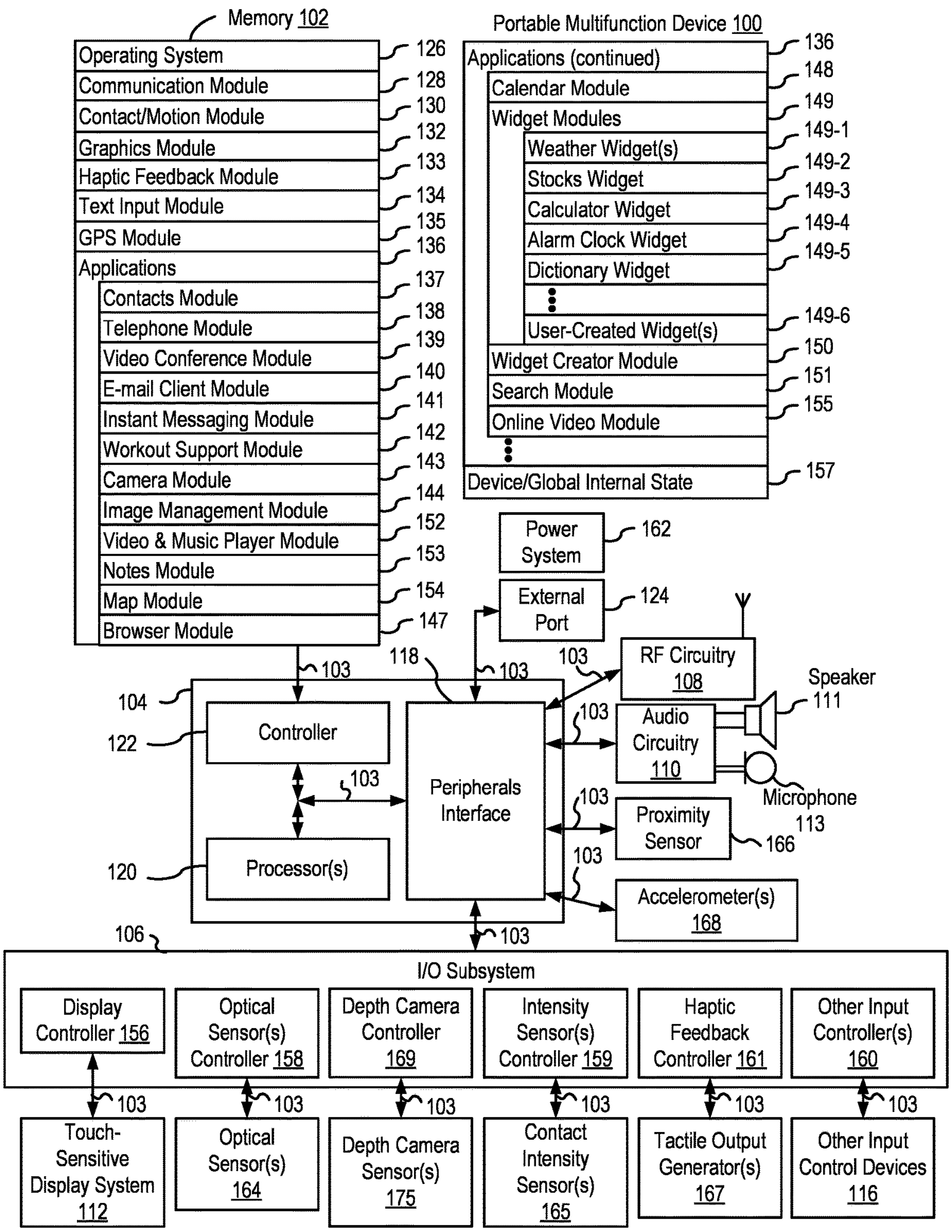
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing lists of items. For example, when organizing a list of items, an item can be moved to different categories. Such techniques can reduce the cognitive burden on a user who manages a list of items, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing a list of items. FIGS. 6A-6G illustrate exemplary user interfaces for managing a list of items in accordance with some embodiments. FIG. 7 is a flow diagram illustrating methods of managing a list of items in accordance with some embodiments.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both cars) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "O" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's car (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
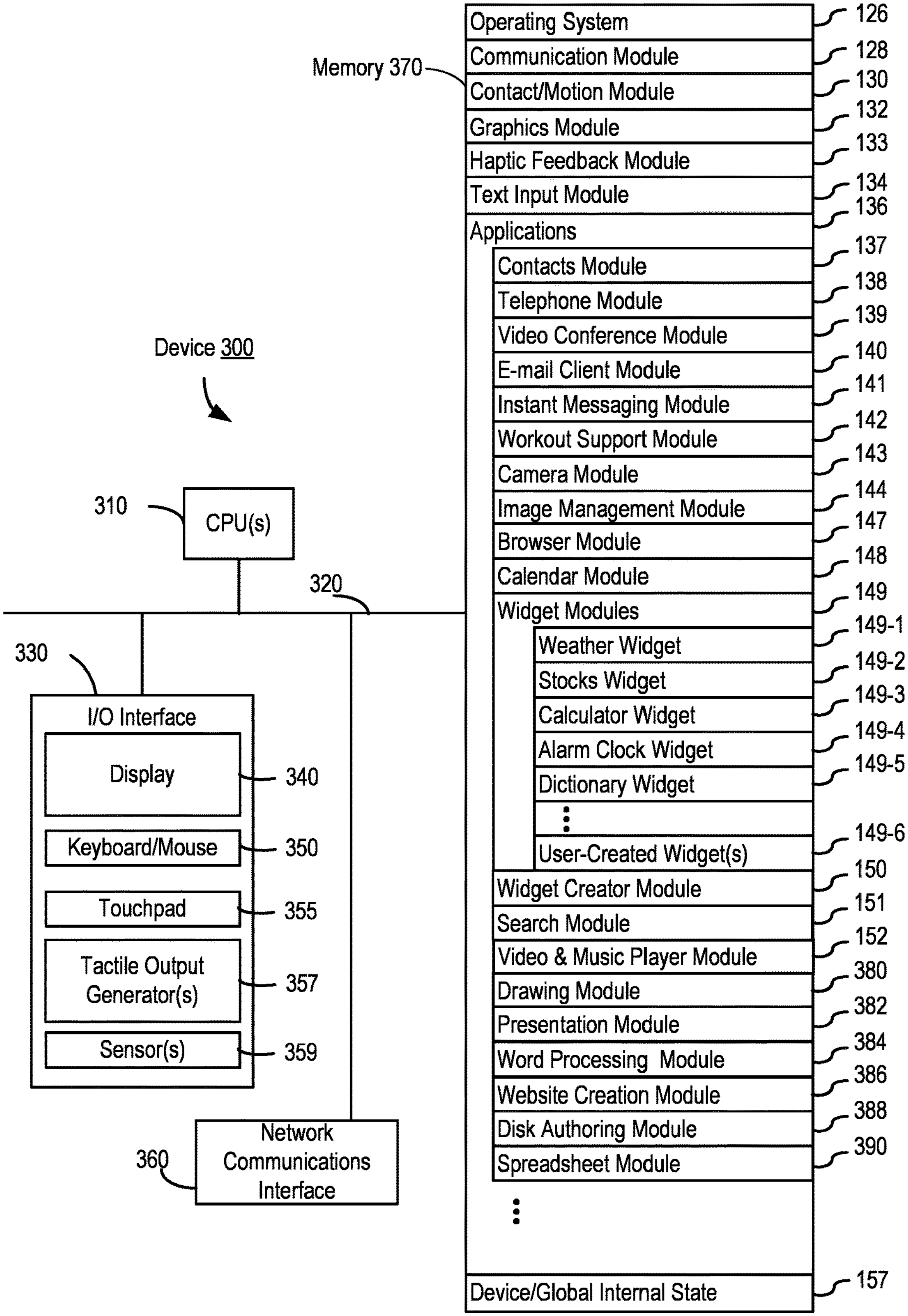
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
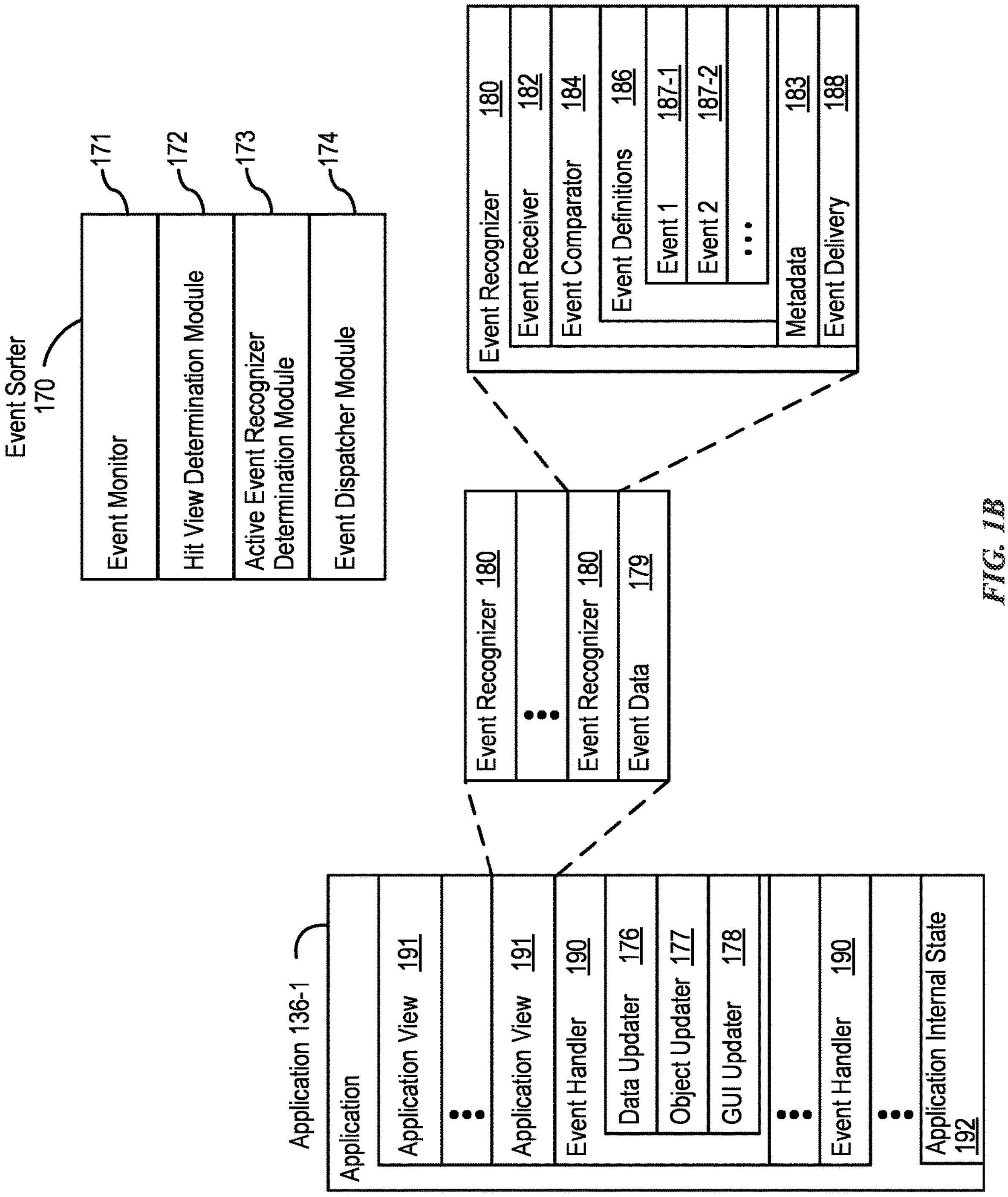
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object.

In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
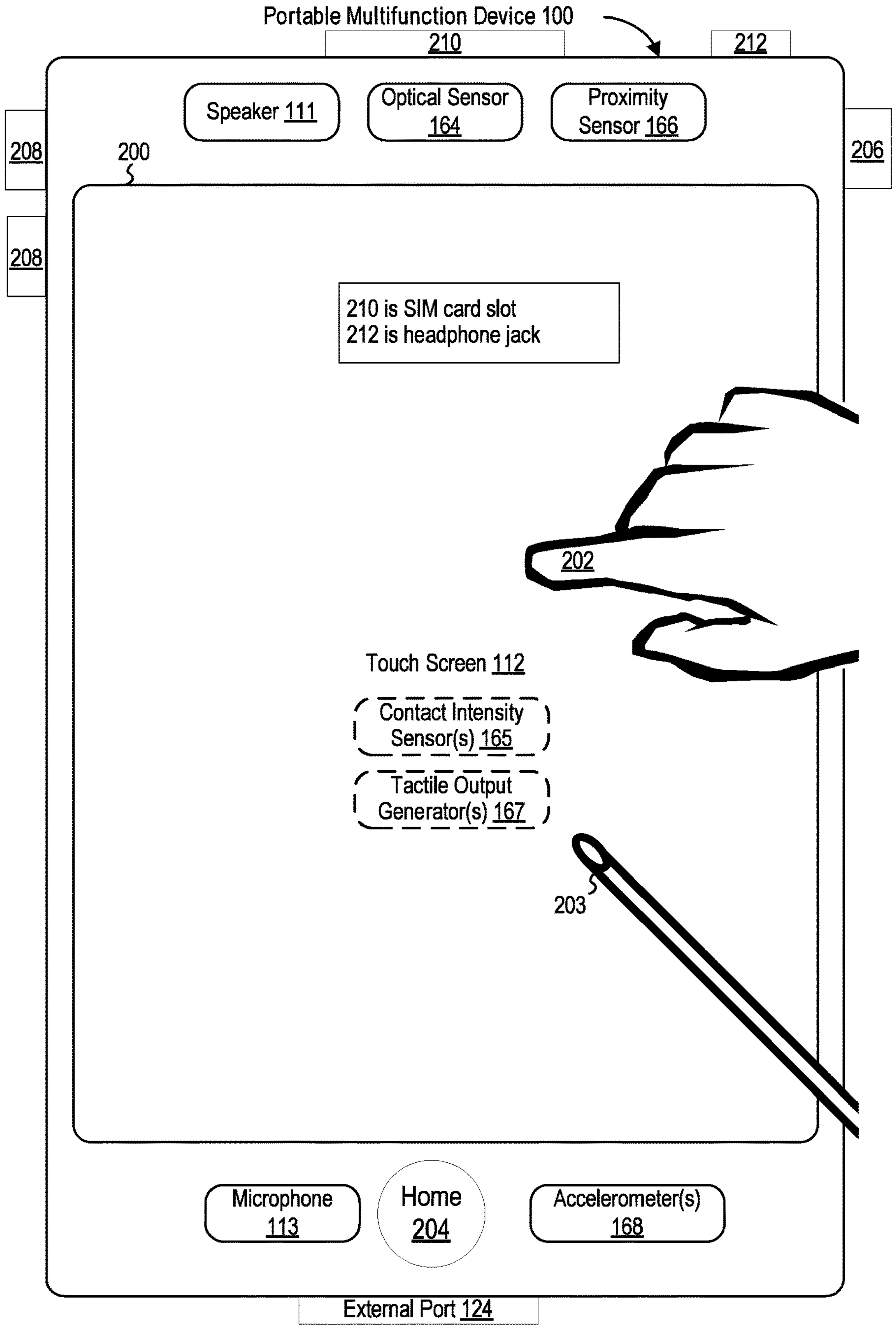
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
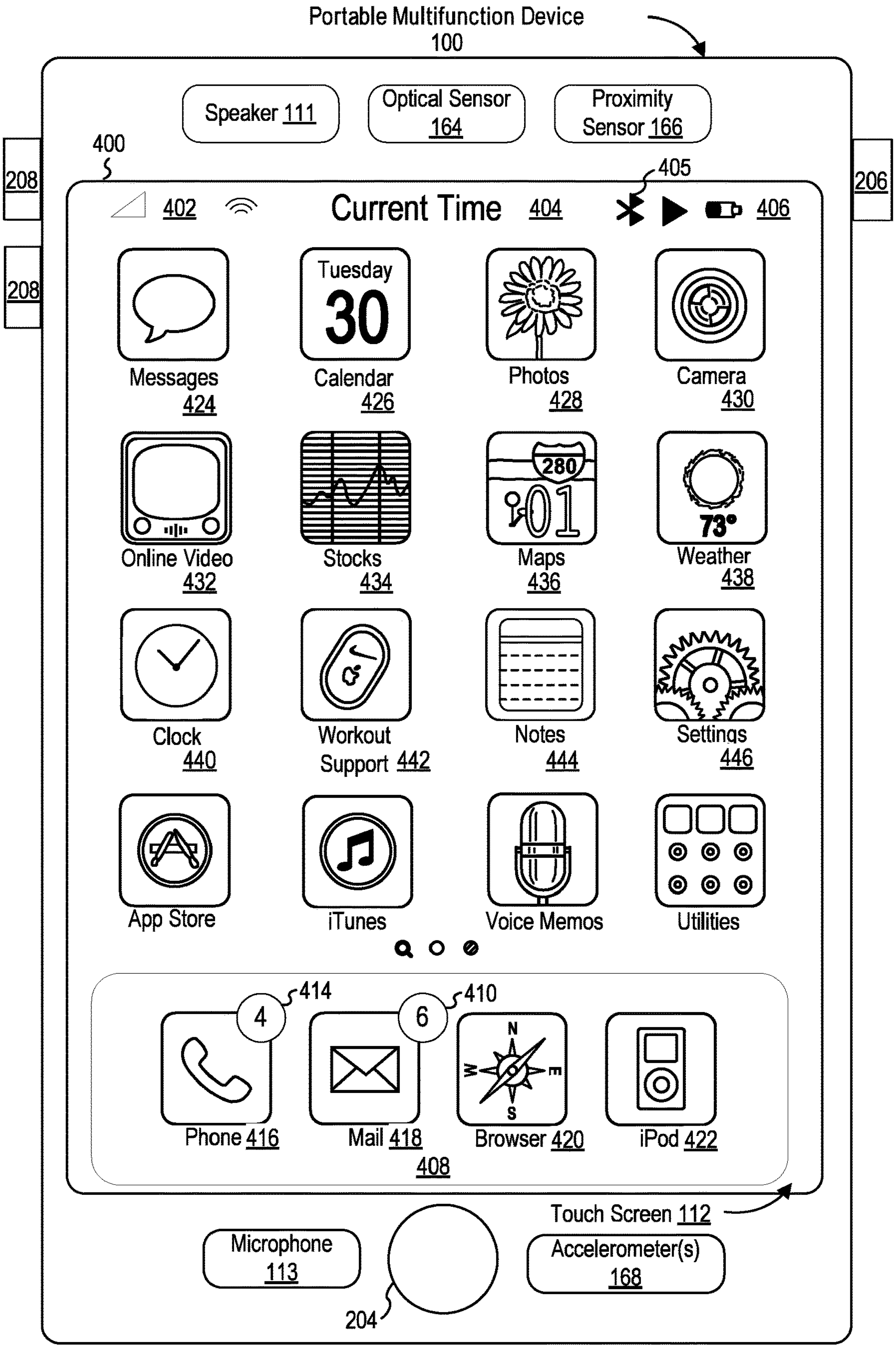
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
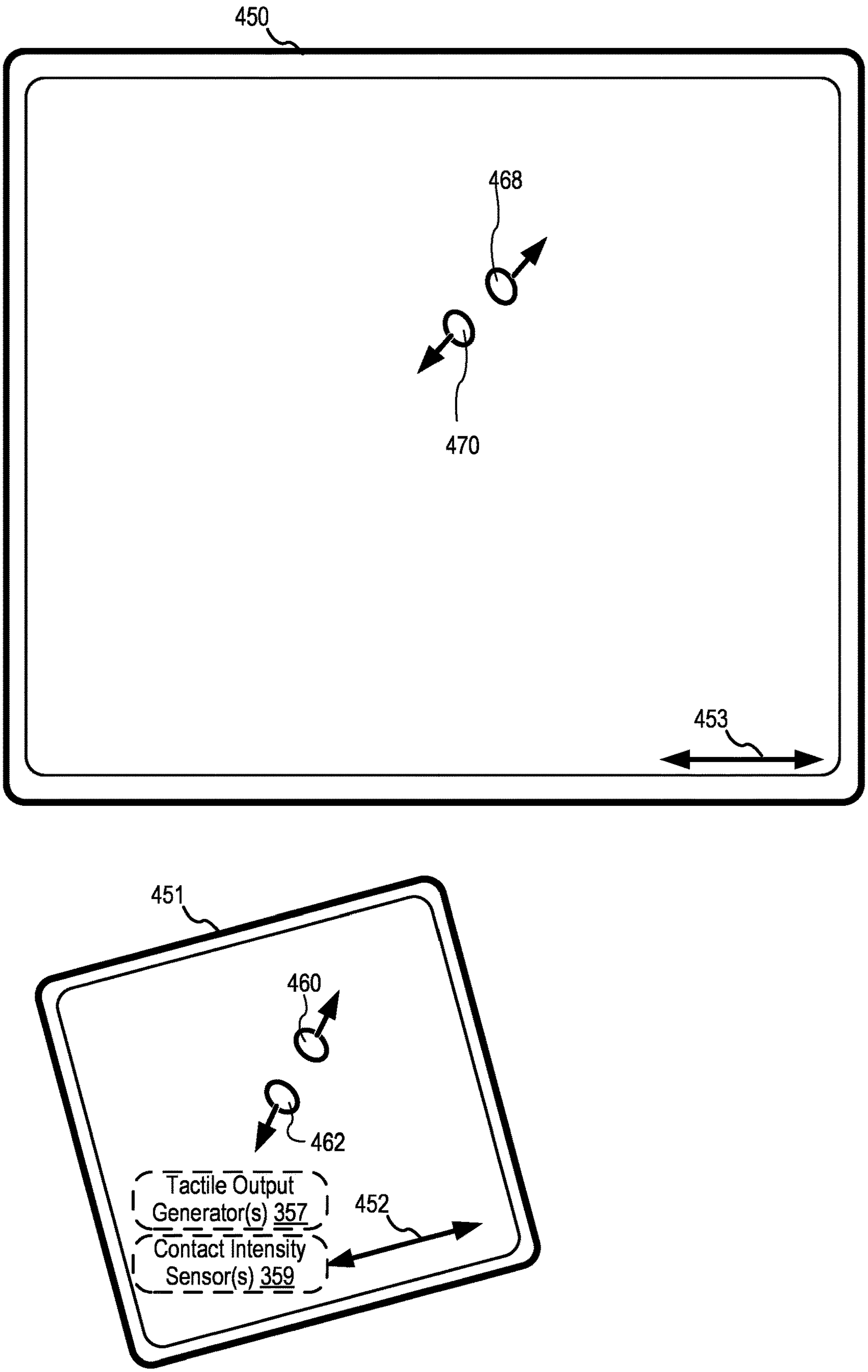
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
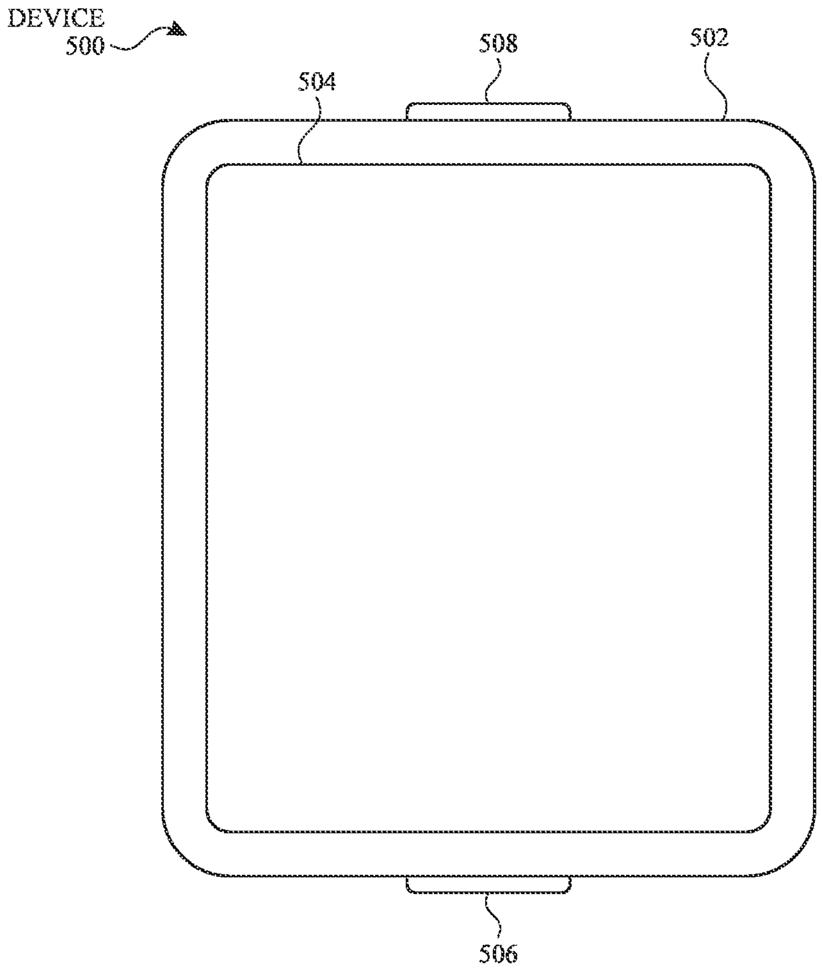
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
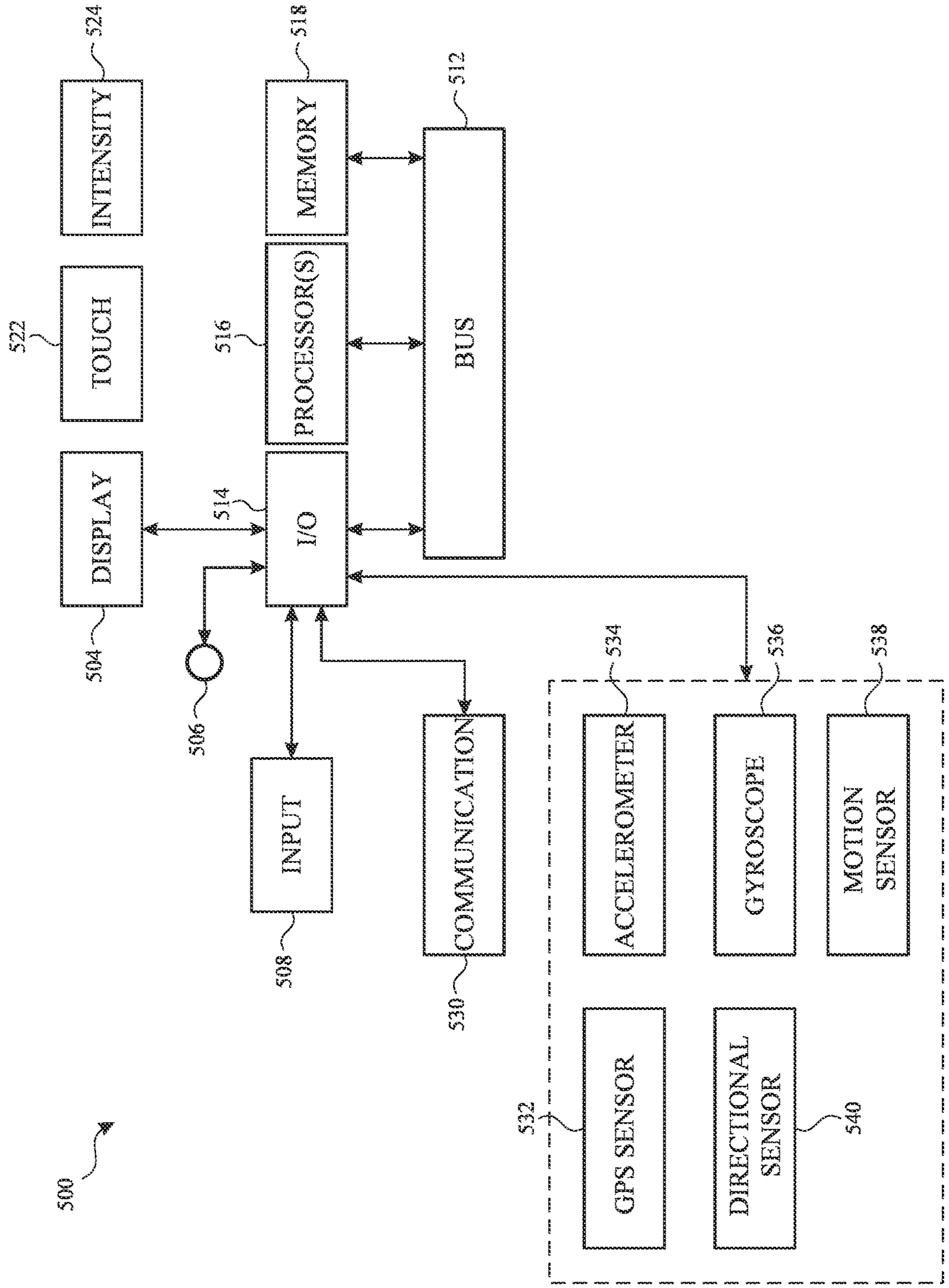
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

Figure 6A:
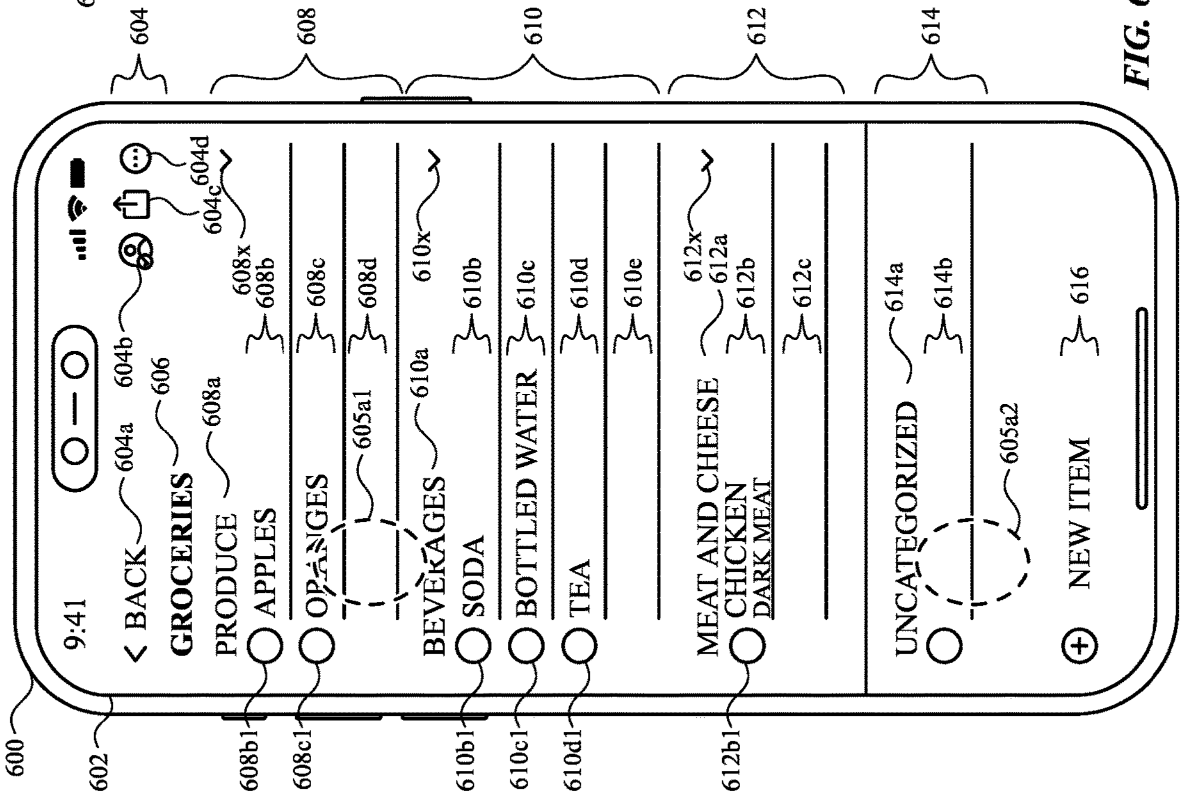
FIGS. 6A-6Q illustrate exemplary user interfaces for managing a list of items in accordance with some embodiments.
Figure 6B:
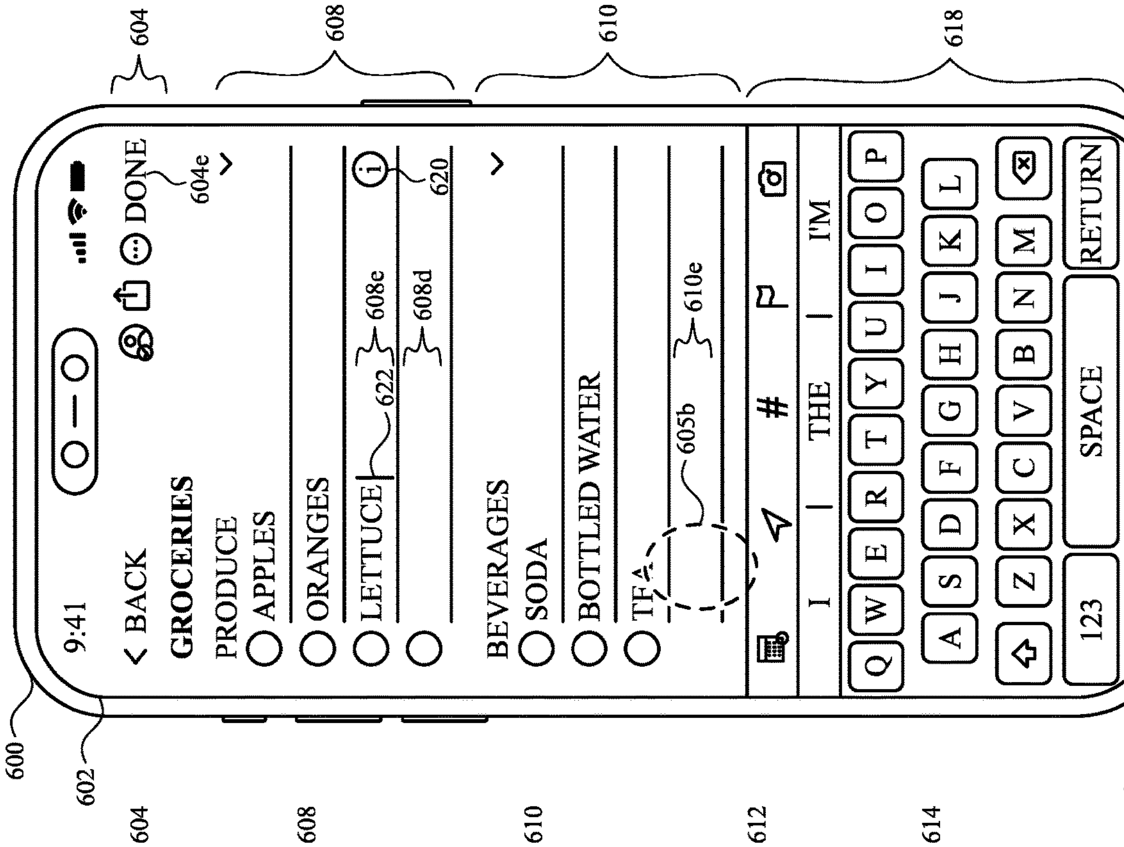
Figure 6D:
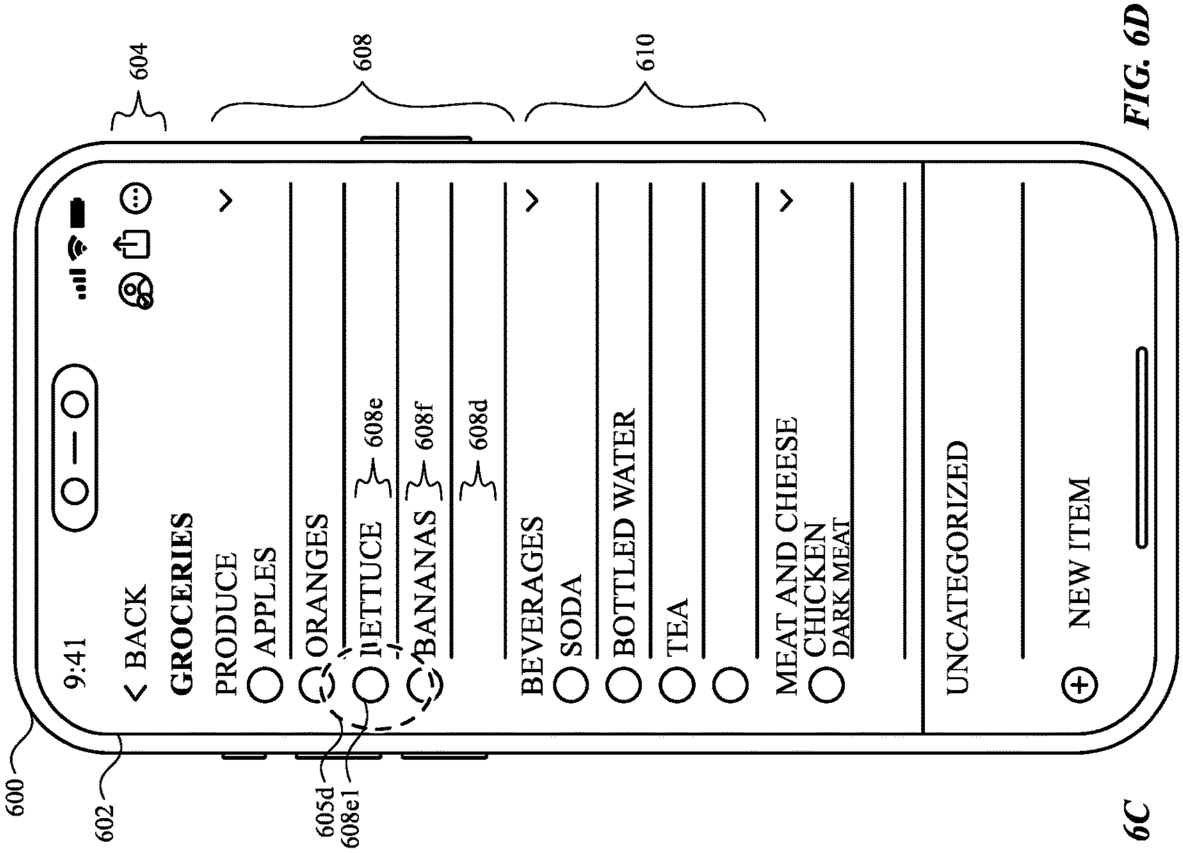
Figure 6C:
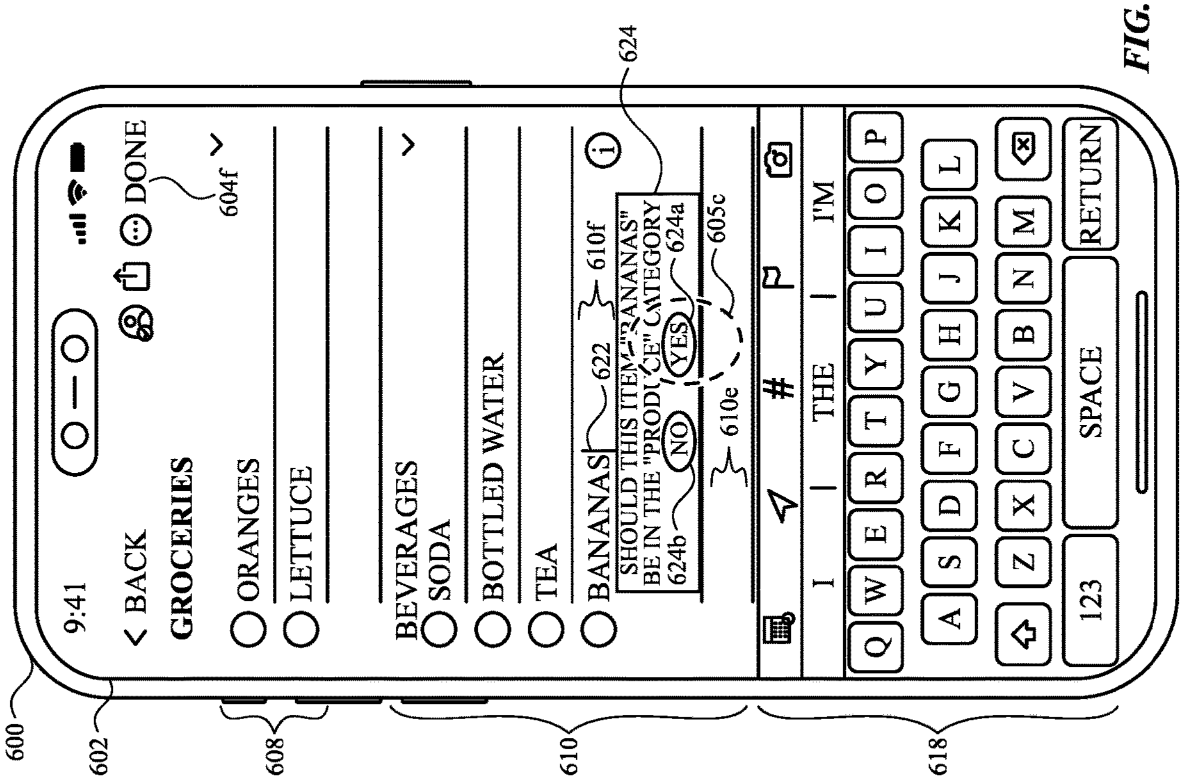
Figure 6F:
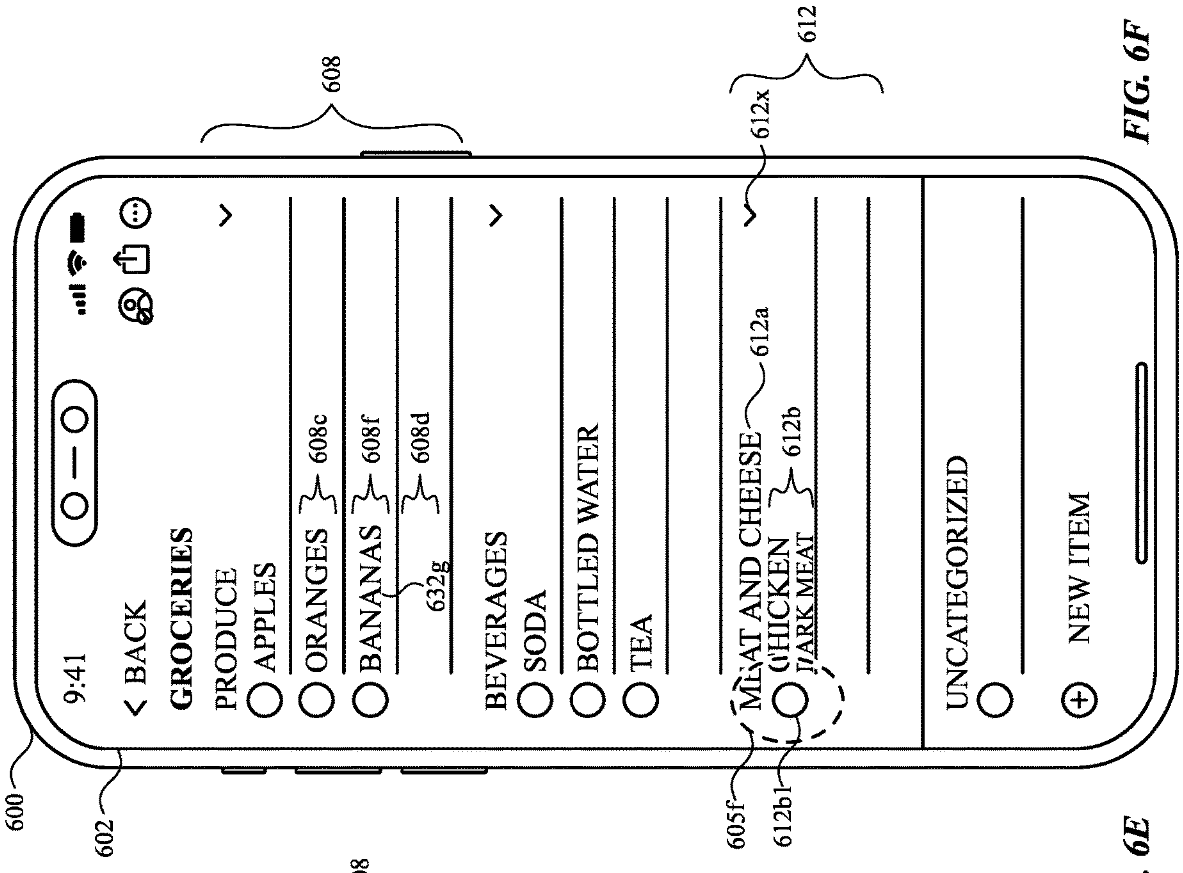
Figure 6E:
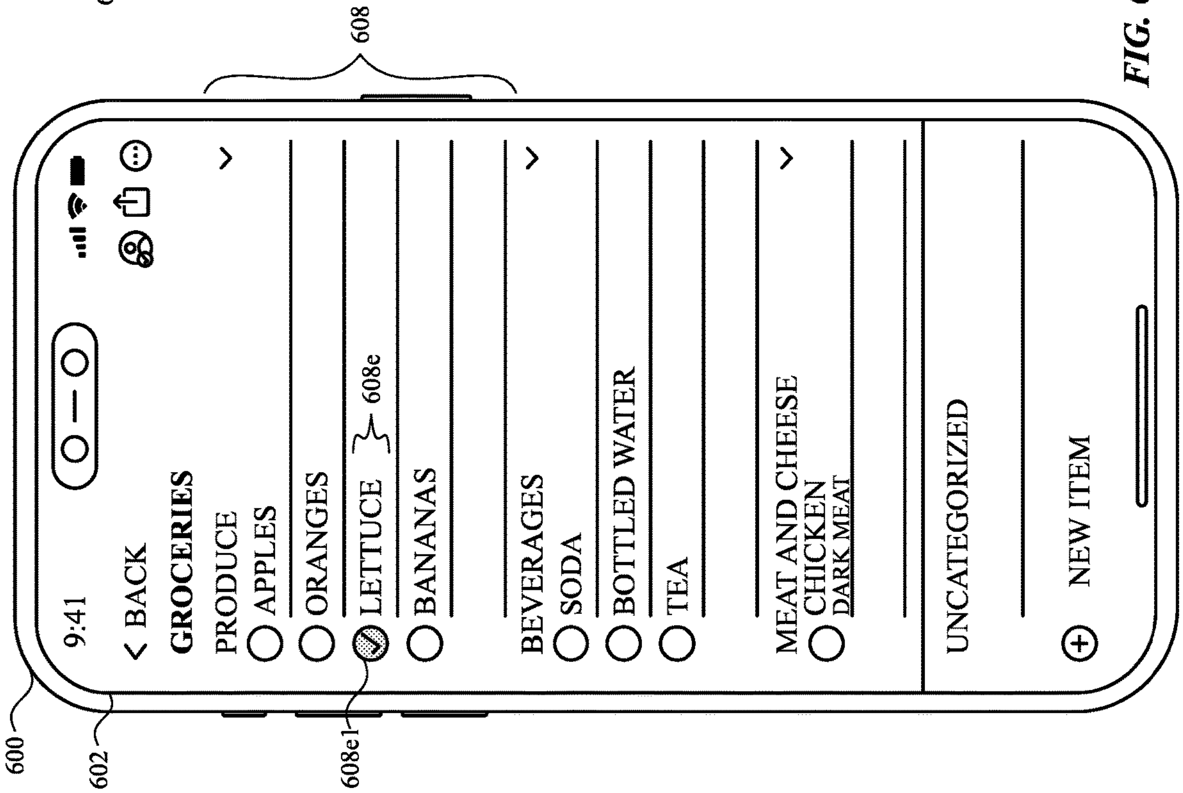
Figure 6H:
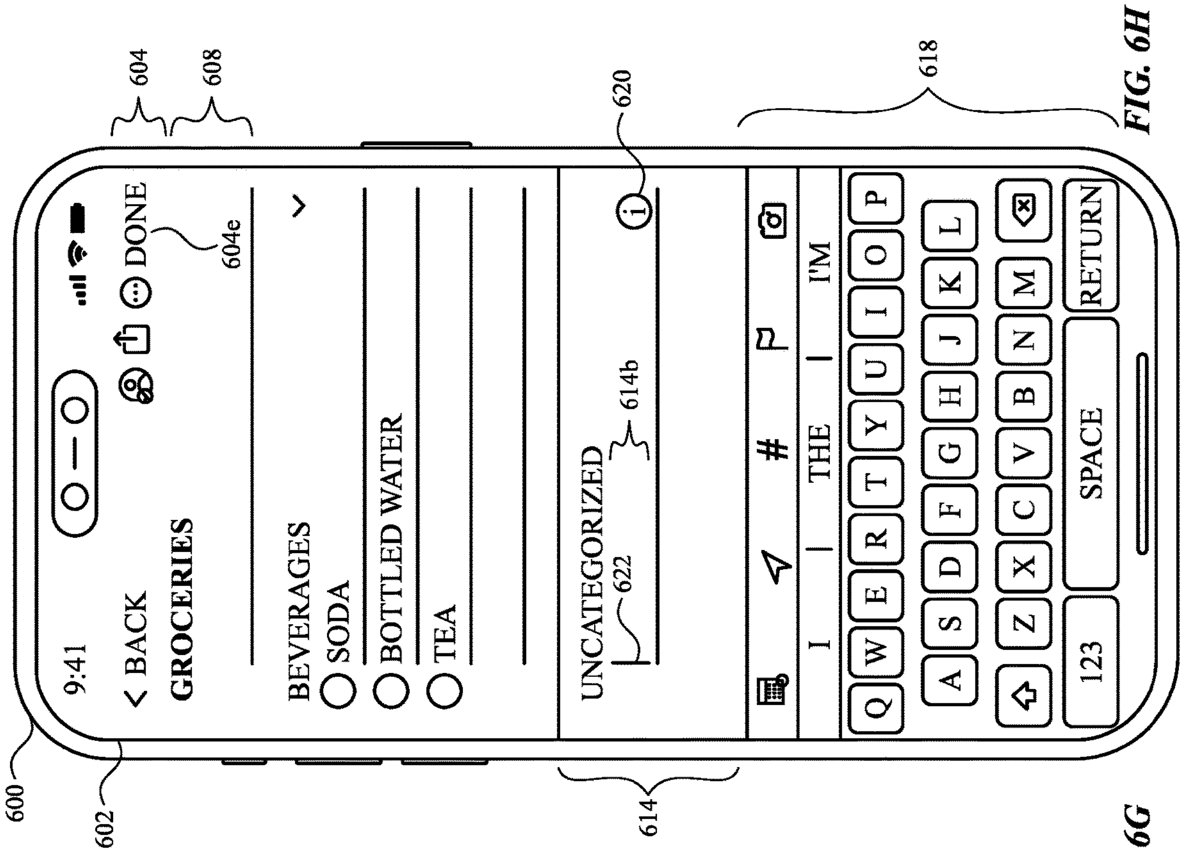
Figure 6G:
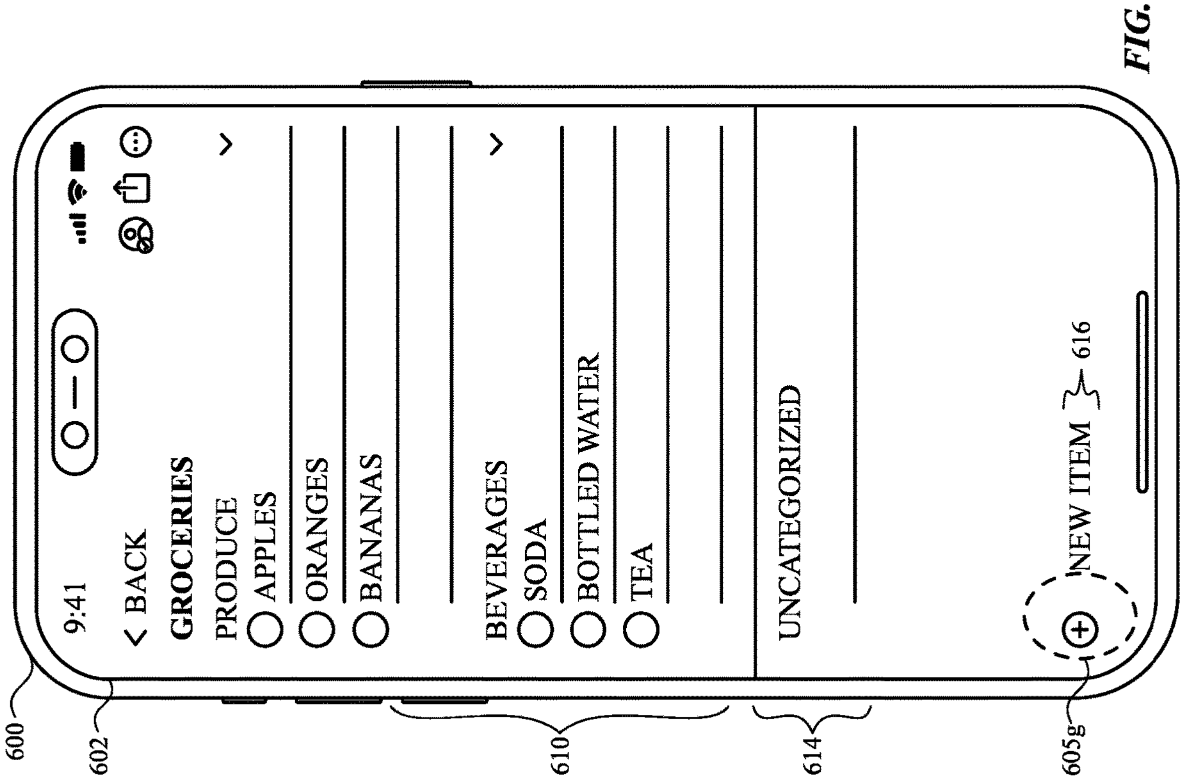
Figure 6J:
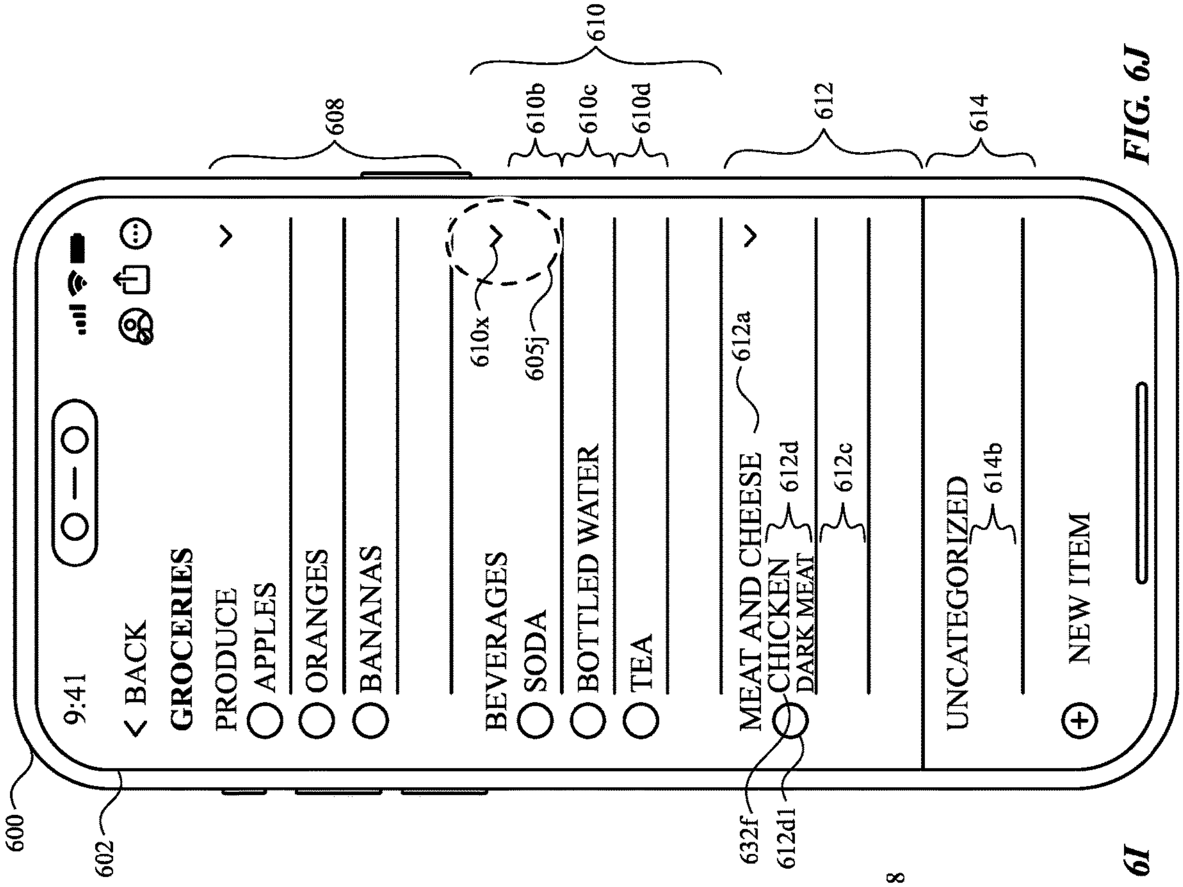
Figure 6I:
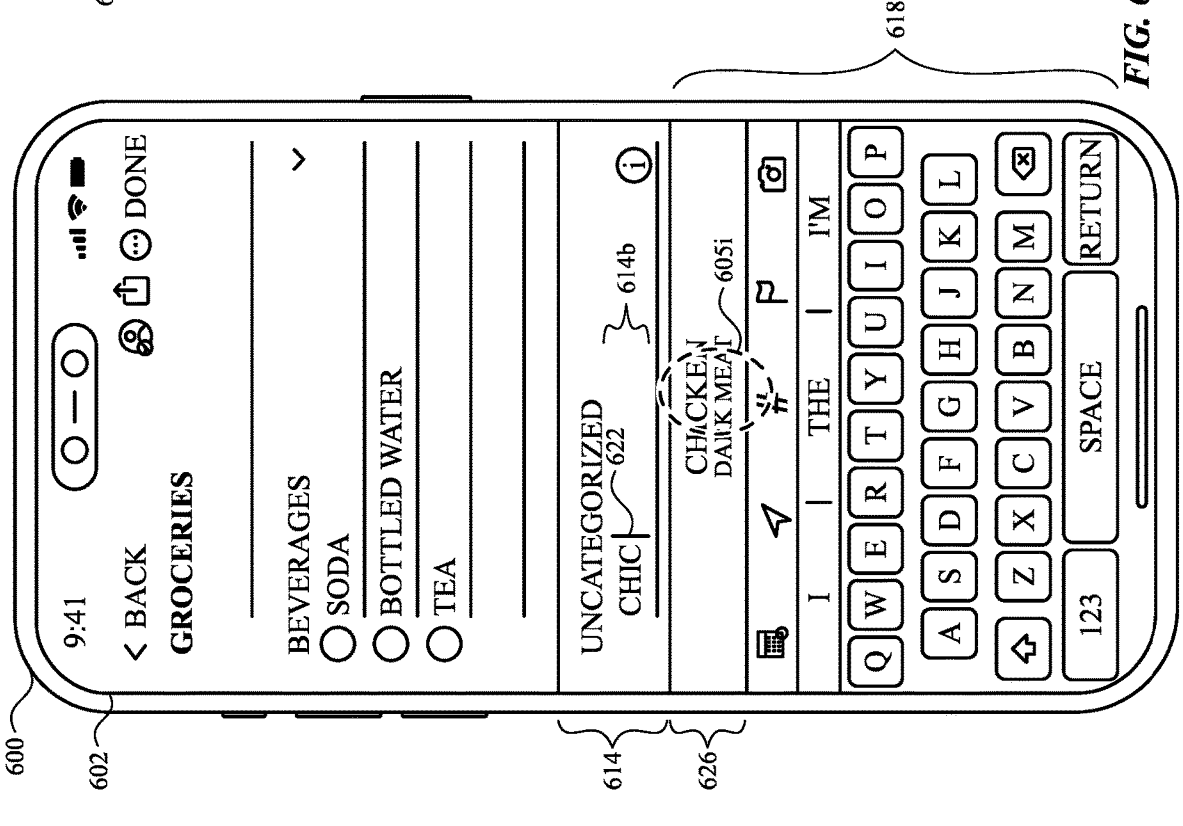
Figure 6L:
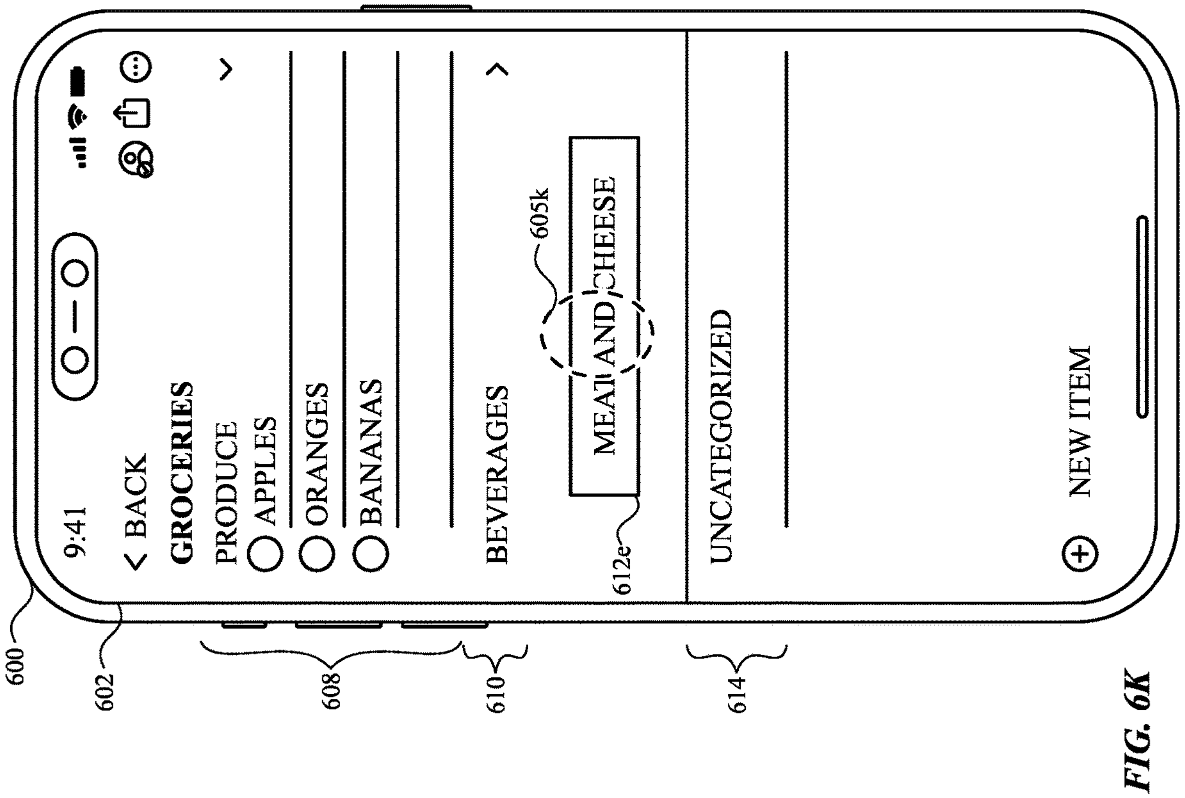
Figure 6K:
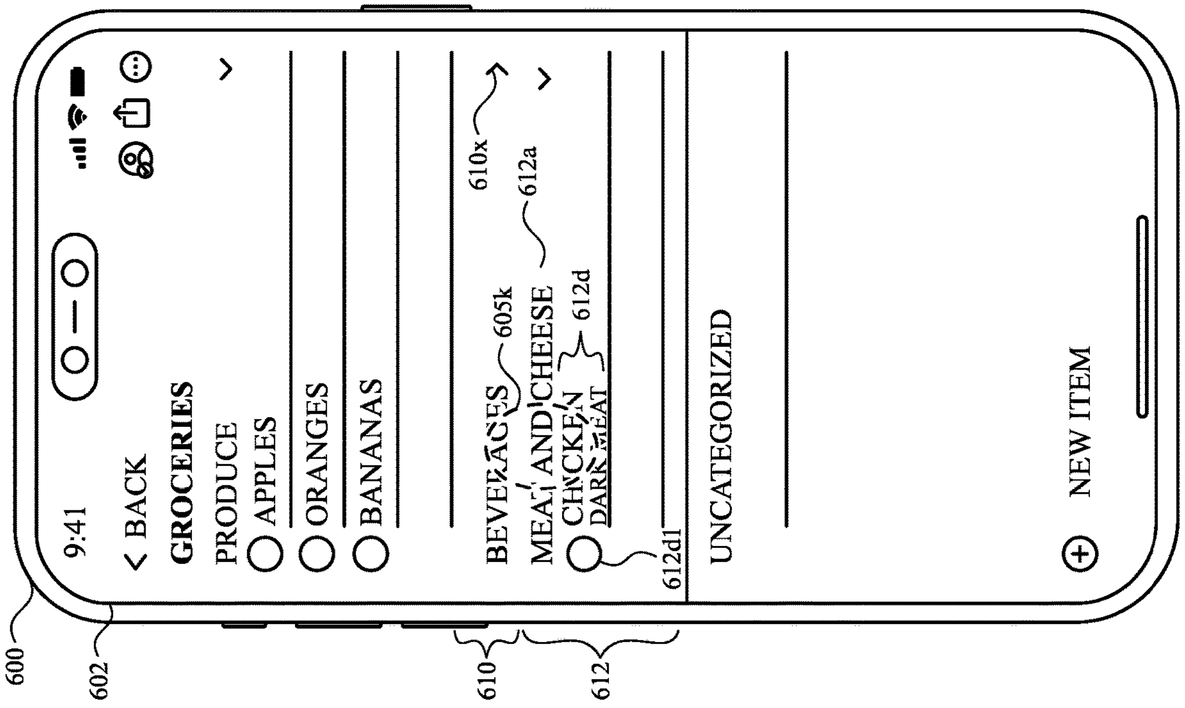
Figure 6M:
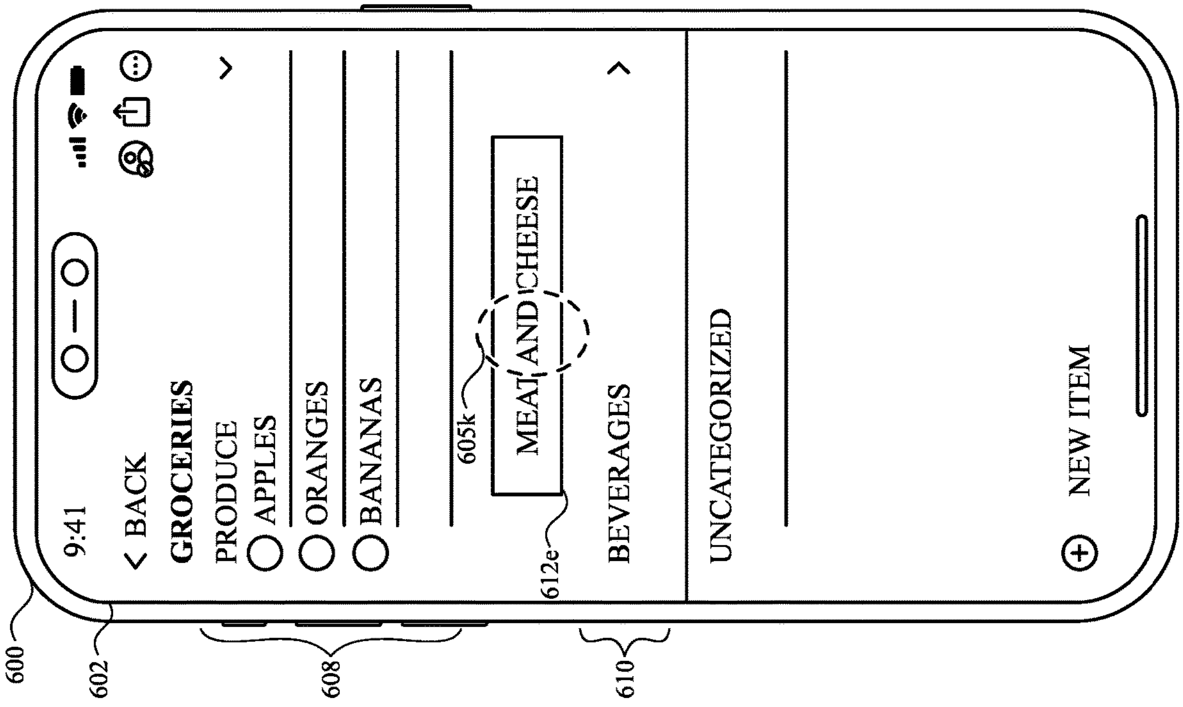
Figure 6N:
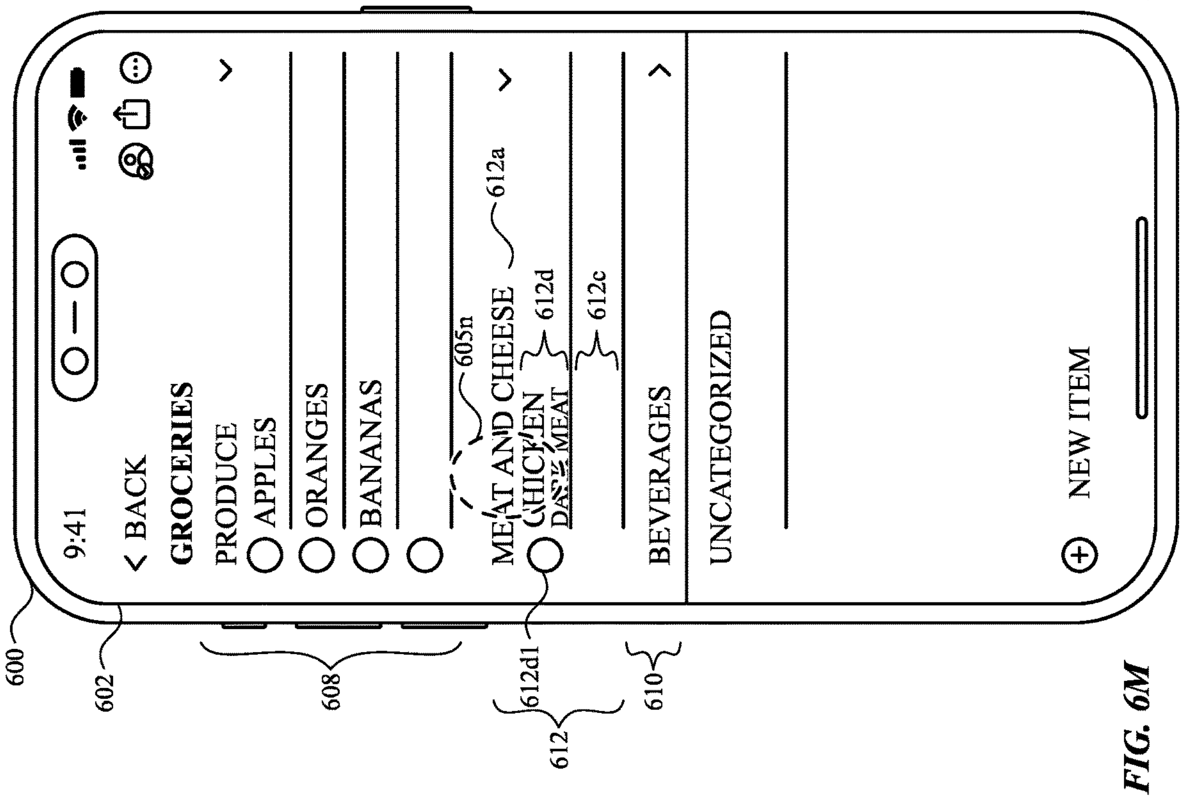
Figure 6P:
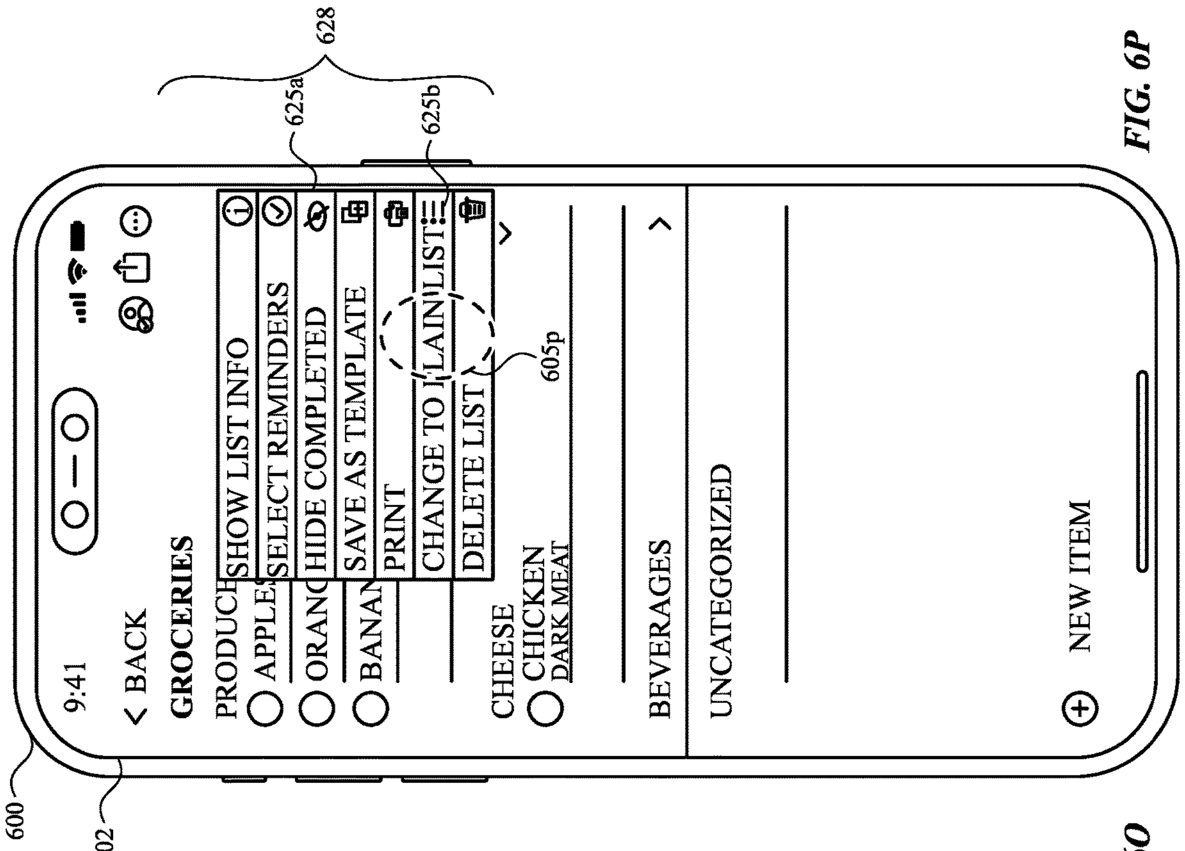
Figure 6O:
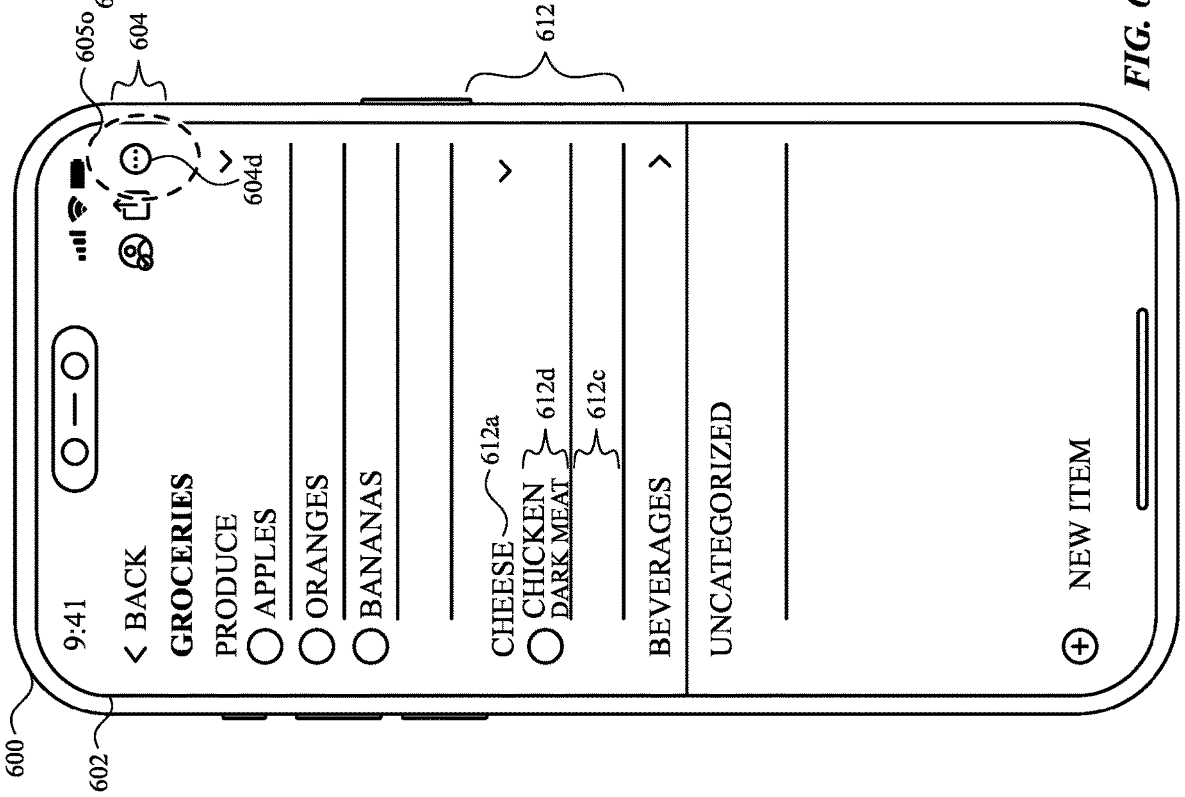
Figure 6Q:
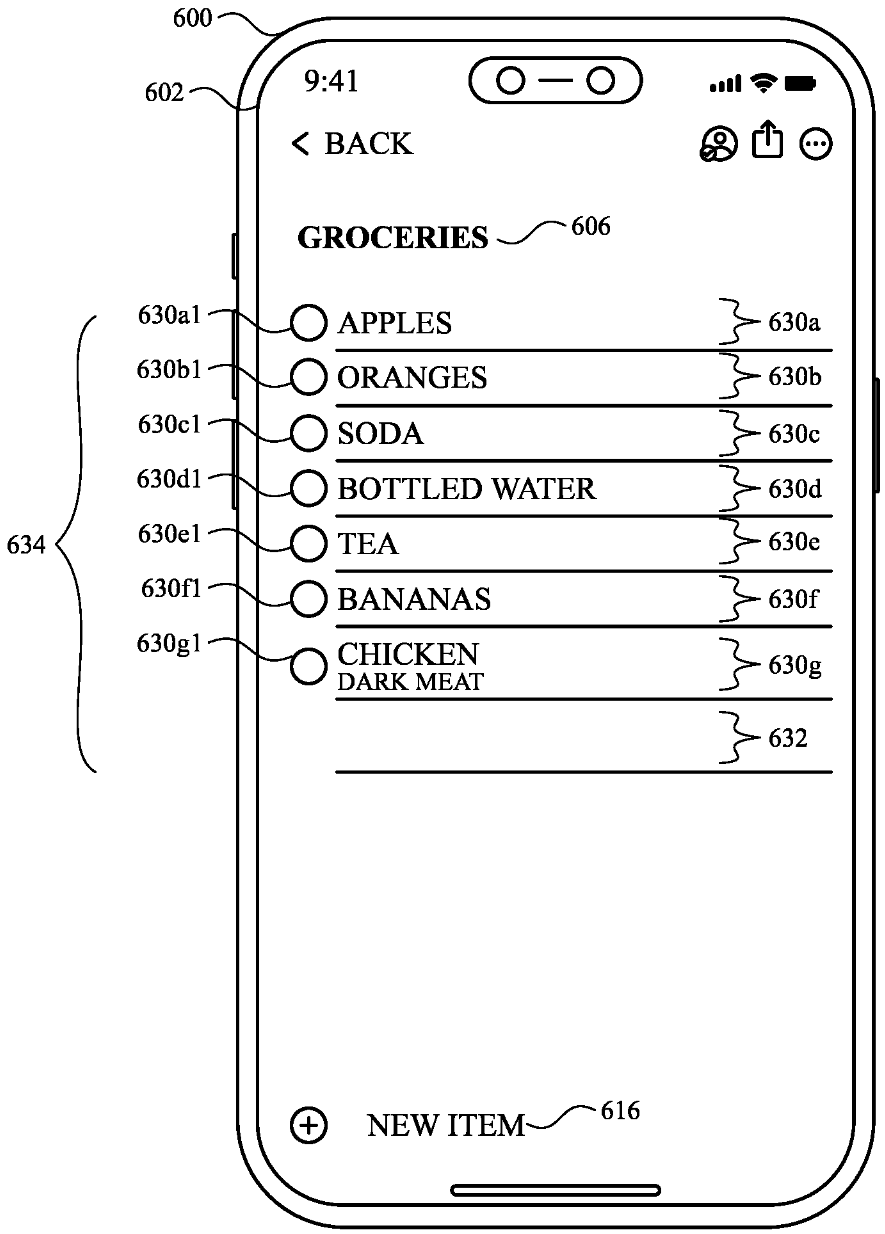
Figure 7:
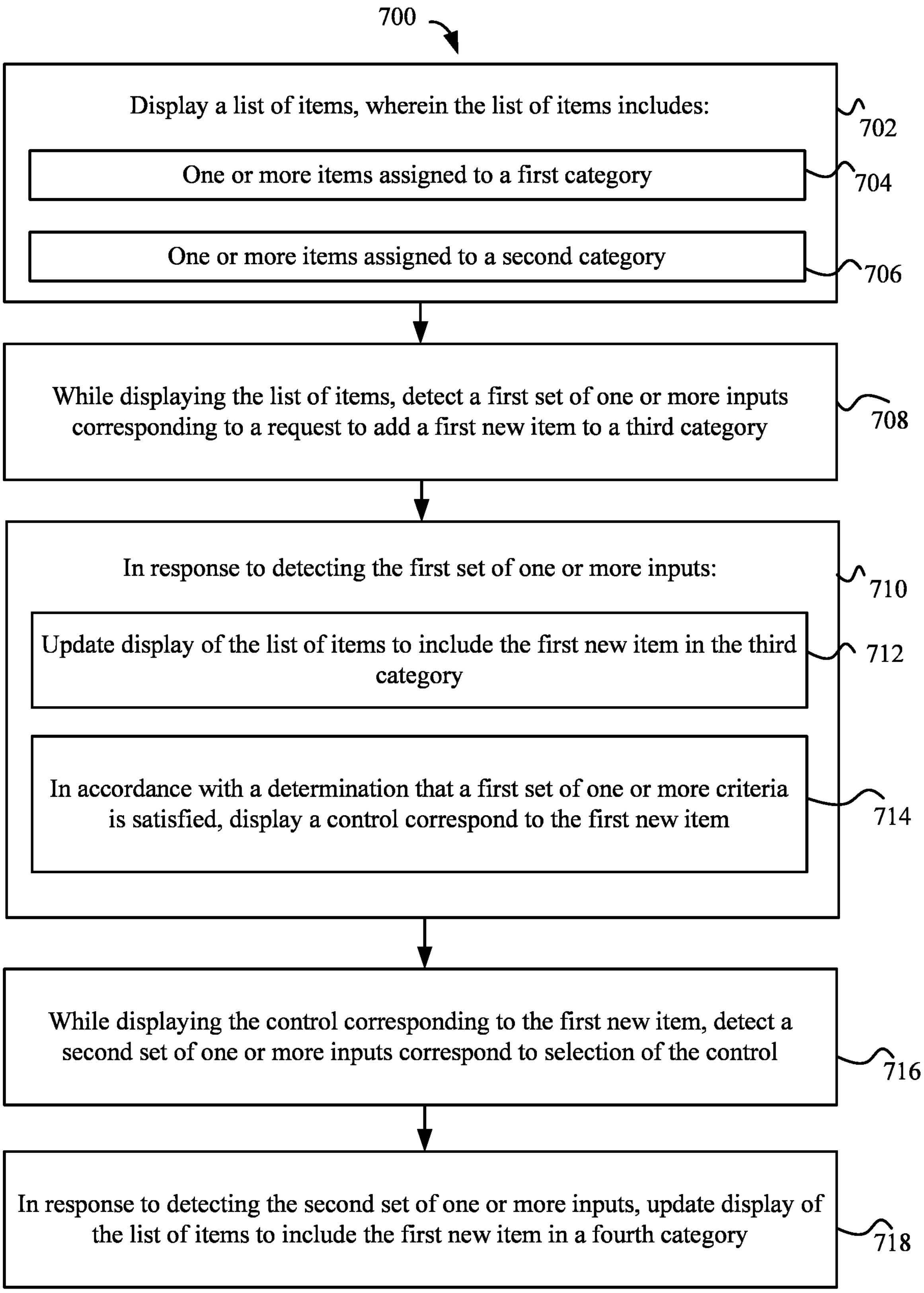
FIG. 7 is a flow diagram illustrating a method for managing a list of items in accordance with some embodiments.

FIGS. 6A-6Q illustrate exemplary user interfaces for managing a list of items using an electronic computer system in accordance with some examples. The list of items in these figures corresponds to a list of grocery items that have been added to a grocery list by one or more users. The user interfaces in these figures are used to illustrate the processes described below, including the processes in FIG. 7.

As illustrated in FIG. 6A, computer system 600 displays grocery list user interface 602. In some examples, grocery list user interface 602 is a user interface of a notes, list, and/or reminders application executing on computer system 600. For example, an application corresponding to the user interface can include multiple lists similar to those illustrated in FIG. 6A. Moreover, different lists of the application can be navigated to and/or displayed through interactions with the application. In some examples, computer system 600 includes one or more components of devices 100, 300, and 500.

As illustrated in FIG. 6A, grocery list user interface 602 corresponds to and includes display of the list of items in one or more categories. Such categories can be defined by the application and/or one or more users. In some examples, some items in the list of items are automatically categorized into the one or more categories by the application (e.g., including categories created by users), as further discussed below.

As illustrated in FIG. 6A, computer system 600 displays grocery list user interface 602 to include control region 604, list indicator 606, multiple different regions (e.g., first region 608, second region 610, third region 612, and uncategorized region 614) for different items in the list of items, and new item control 616 for adding a new item as described below with respect to FIGS. 6G-6J. It should be recognized that grocery list user interface 602 can include different, more, and/or or fewer user-interface elements than illustrated in FIG. 6A, such as different regions for different items, more regions when there are more categories, and/or fewer regions when there are less categories.

In some examples, list indicator 606 indicates a title (e.g., "Groceries") of the list of items that computer system 600 is currently displaying. In such examples, computer system 600 can detect input to define the title when the list of items is created and/or at some point after. In some examples, control region 604 includes multiple controls corresponding to grocery list user interface 602. Examples of such controls include back control 604*a*, manage control 604*b*, share control 604*c*, and options control 604*d*. In some examples, in response to detecting an input that corresponds to selection of return control 604*a*, computer system 600 displays another user interface (e.g., a previously displayed user interface, such as a landing page and/or other user interface of the application). In such examples, the landing page and/or other user interface can include a list of different lists to be selected and displayed. In some examples, in response to detecting an input that corresponds to selection of manage control 604*b*, computer system 600 displays a management user interface (e.g., a user interface to add, modify, and/or remove users and/or devices that the list of items in grocery list user interface 602 is currently shared with). In such examples, other users, whom the list of items is shared with, can edit the list of items, including changing how automatic categorizations are performed, as further discussed below. In some examples, in response to detecting an input that corresponds to selection of send control 604*c*, computer system 600 displays a sending user interface (e.g., a user interface to send the list of items in grocery list user interface 602 to another user and/or device). In such examples, sending the list can be different than sharing the list, as sharing the list synchronizes the list between users while sending the list causes computer system 600 to send a copy of the list that is not synchronized between users. In some examples, in response to detecting an input that corresponds to selection of options control 604*d*, computer system 600 displays an options user interface (e.g., a list of options corresponding to grocery list user interface 602, as further discussed below with respect to FIG. 6P).

In some examples, each item in the list of items was added to the list of items via input detected by a computer system, such as computer system 600 and/or another computer system associated with the user of computer system 600 and/or another user for which the list of items is shared. In some examples, adding an item to the list of items and/or moving an item to a category includes defining a category for the item. In such examples, adding the item to a particular category can cause the item and/or a similar item to be automatically categorized into the particular category in the future based on the item being added to the particular category once. In other examples, adding an item to the list of items does not define a category and instead the item is automatically categorized in accordance with a determination that the item corresponds to a particular category (e.g., the item is not assigned to a category in accordance with a determination that the item does not correspond to any particular category). In other examples, an item is categorized after being added to the list of items, such as when the list of items is changed to a type of list that automatically categorizes items. In some examples, the determination that the item corresponds to a category is specific to a particular list. For example, categorizations established for a particular list are not used with respect to another list. It should be understood that the determination that the item corresponds to a particular category can be performed using any technique known by a person of ordinary skill in the art, such as by using machine learning, artificial intelligence, and/or a set of one or more rules.

As illustrated in FIG. 6A, grocery list user interface 602 includes multiple category regions (e.g., first region 608, second region 610, and third region 612). In some examples, each category region in grocery list user interface 602 corresponds to a different category. In such examples, representations of items in a category are displayed in a category region corresponding to the category. For example, item 608*b* includes "Apples" and is included in first region 608 (e.g., "Produce"). For ease of discussion, (1) the terms category and region will be used interchangeably in the description for FIGS. 6A-6Q and (2) the term "item" will be used when referring to an item in the list of items and a representation of an item in grocery list user interface 602. For any particular instance, a person of ordinary skill in the art will recognize whether a sentence is referring to a category of items, a region in a user interface, an item in the list of items, or a representation of an item in grocery list user interface 602.

As also illustrated in FIG. 6A, grocery list user interface 602 includes a region for items that are not in a category (e.g., uncategorized region 614). In some examples, when an item is added to uncategorized region 614, computer system 600 moves the item to a region for a category that is determined to correspond to the item. In such examples, when no category is determined to correspond to the item, computer system 600 keeps the item in uncategorized region 614. In such examples, computer system 600 displays uncategorized region 614 at a terminal position of grocery list user interface 602 (e.g., at the top or the bottom).

As illustrated in FIG. 6A, each region in grocery list user interface 602 includes a title (e.g., first title 808*a* ("Produce"), second title 610*a* ("Beverages"), third title 612*a* ("Meat and Cheese"), and fourth title 614*a* ("Uncategorized")), zero or more items (e.g., item 608*b* and item 608*c* in first region 608; item 610*b*, item 610*c*, and item 610*d* in second region 610; item 612*b* in third region 612; and no items in uncategorized region 614), a text entry field (e.g., text entry field 608*d*, text entry field 610*e*, text entry field 612*c*, and text entry field 614*b*), and a caret (e.g., caret 608*x*, caret 610*x*, and caret 612*x*). In some examples, the title of a region is assigned by a user and/or predefined by the application. In such examples, computer system 600 detects input to create a new category with a particular title and/or detects input to change the title of an existing category. In some examples, a text entry field text is a selectable field able to receive input detected via one or more input devices in communication with computer system 600 to add additional items to different categories. For example, in response to receiving a request to add an item in text entry field 608*d*, computer system 600 adds the item to first region 608, which includes text entry field 608*d*. Similarly, in response to receiving a request to add an item in text entry field 610*e*, computer system 600 adds the item to second region 610, which includes text entry field 610*c*. In some examples, a caret is a user-interface element that is selectable to expand and/or collapse a region, causing one or more items included in the region to be displayed when expanding and no longer be displayed when collapsing. Notably, FIG. 6A illustrates that uncategorized region 614 does not include a caret to expand and/or collapse items included in uncategorized region 614. In some examples, computer system 600 displays a caret for uncategorized region 614 in response to detecting one or two or more items in uncategorized region 614. In other examples, uncategorized region 614 is not able to be collapsed and/or minimized and accordingly does not ever include a caret.

As illustrated in FIG. 6A, each item in grocery list user interface 602 includes a check circle icon (e.g., check circle icon 608*b*1, check circle icon 608*cl*, check circle icon 6010*b*1, check circle icon 610*cl*, check circle icon 610*d*1, check circle icon 612*b*1). In some examples, in response to detecting input corresponding to a check circle icon, computer system 600 identifies an item corresponding to the check circle icon as completed. In such examples, identifying the item as completed can include changing a visual appearance of the item (e.g., including the check circle icon) and/or removing display of the item from grocery list user interface 602. In some examples, in response to detecting input corresponding to a check circle icon, computer system 600 changes a visual appearance of the check circle icon and/or ceases to display an item (e.g., including the check circle icon) corresponding to the check circle icon. Notably, FIG. 6A illustrates that text entry fields (e.g., text entry field 608*d*, text entry field 610*e*, text entry field 612*c*, and text entry field 614*b*) do not include a check circle icon. In some examples, a text entry field includes a check circle icon, similar to items (e.g., item 608*b* and item 608*c*) in first region 608. In some examples, computer system 600 displays a check circle icon for a text entry field in response to detecting input directed to the text entry field. For example, in response to detecting a tap input at text entry field 608*d* (e.g., causing a text insertion indication (e.g., text insertion indication 622, as illustrated in FIG. 6B) to be displayed in text entry field 608*d*), computer system 600 displays a check circle icon for text entry field 608*d* (e.g., in an area corresponding to text entry field 608*d*). For another example, in response to detecting a character input corresponding to a request to add a character to text entry field 608*d* (and not merely a tap input directed to text entry field 608*d*), computer system 600 displays a check circle icon for text entry field 608*d*.

In some examples, an item in the list of items includes additional content for an item, such as additional content that is added to the item. Notably, as illustrated in FIG. 6A, item 612*b* includes additional content. In particular, item 612*b* corresponds to "Chicken" and includes a note added by a user (e.g., "Dark Meat"). In some examples, the note is added to item 612*b* to provide additional context and/or information for item 612*b*. In some examples, additional content is displayed in response to detecting one or more inputs. For example, computer system 600 can display additional content for an item in response to detecting a tap input directed to the item and another tap input directed to a detail icon (e.g., detail icon 620 in FIG. 6B, as described further below) that is displayed after the tap input. Examples of additional content include an image, a video, a media item, a link to a webpage, a document, and/or a calendar event.

In some examples, computer system 600 displays different regions and/or different items in a region in an order in grocery list user interface 602 based on time of input. For example, a region with an item that was most recently input can be at a terminal position (e.g., at the top, bottom, or some other position) of grocery list user interface 602. For another example, an item within a region that was most recently added to the region can be at a terminal position (e.g., at the top, bottom, or some other position) of the region. In some examples, regions and items within a region are each organized in a different manner, such as different regions are organized from top to bottom while different items in a region are organized from bottom to top).

The remaining discussion of FIGS. 6A-6D illustrate examples of adding items to different categories and, when an item added to a category is determined to be wrong, suggesting a different category with a control that, when selected, causes the item to be automatically added to the different category.

At FIG. 6A, computer system 600 detects tap input 605*al* directed to (e.g., corresponding to selection of) text entry field 608*d*. In some examples, in response to detecting tap input 605*al*, computer system 600 displays a text insertion indicator (e.g., text insertion indicator 622, as illustrated in FIG. 6B) within text entry field 608*d*. In such examples, the text insertion indicator can be displayed on the left side of text entry field 608*d* (e.g., as illustrated with respect to text entry field 614*b* in FIG. 6H).

In some examples, in response to detecting tap input 605*al*, computer system 600 displays a detail icon (e.g., detail icon 620, as illustrated in FIG. 6B) for text entry field 608*d*. In such examples, the detail icon can be selected (e.g., via a tap input) to display an overlay and/or user interface on top of grocery list user interface 602 to view and/or add details related to an item. In some examples, a detail icon is displayed on any item that is currently being focused on (e.g., that computer system detects a tap input at). In such examples, selection of the detail icon causes details to be displayed related to the item, such as the additional content described above.

In some examples, in response to detecting tap input 605*al* and in accordance with a determination that computer system 600 is not in communication with one or more input devices (e.g., a physical keyboard and/or other text input mechanism, such as a microphone and/or a camera) configured for detecting input with respect to grocery list user interface 602, computer system 600 displays keyboard 618 (e.g., as illustrated in FIG. 6B). In such examples, display of keyboard 618 can occur over a portion of grocery list user interface 602. As illustrated in FIG. 6B, computer system 600 displays keyboard 618 over third region 612 and uncategorized region 614 (e.g., computer system 600 continues to display of first region 608 and second region 610). In some examples, while no longer displayed, third region 612 and uncategorized region 614 are still part of grocery list user interface 602 and computer system 600 displays them in response to computer system 600 detecting input to scroll grocery list user interface 602. In other examples, in response to detecting tap input 605*al* and in accordance with a determination that computer system 600 is not in communication with one or more input devices (e.g., a physical keyboard and/or other text input mechanism, such as a microphone and/or a camera) configured for detecting input with respect to grocery list user interface 602, computer system 600 does not display keyboard 618 and instead relies on the one or more input devices for detecting input.

In some examples, while displaying the text insertion indicator in text entry field 608*d*, computer system 600 detects one or more inputs corresponding to one or more characters. For example, computer system 600 can detect tap inputs on different keys of keyboard 618 to add corresponding characters to text entry field 608*d*. In some examples, after adding one or more characters to text entry field 608*d*, computer system 600 detects a request to add the one or more characters to first region 608. In such examples, the request to add the one or more characters is directed to first region 608 as a result of the one or more characters being added to text entry field 608*d*, as opposed to text entry field 610*e*, text entry field 612*c*, and/or text entry field 614*b*.

As illustrated in FIG. 6B, in response to detecting the request to add the one or more characters to first region 608, computer system 600 displays the one or more characters (e.g., "Lettuce") as an item (e.g., item 608*e*) in first region 608. In some examples, in response to detecting the request to add the one or more characters to first region 608 (e.g., detecting input corresponding to a particular key (e.g., an enter key) and/or input directed to a done icon (e.g., done icon 604*c*), computer system 600 displays a new text entry field (e.g., text entry field 608*d* in FIG. 6B). As illustrated in FIG. 6B, text entry field 608*d* is added below item 608*c*, allowing, in some examples, a user to add another item to first region 608 via text entry field 608*d*.

In some examples, after detecting tap input 605*a*2 and the request to add the one or more characters to uncategorized region 614, "Lettuce" is automatically added (e.g., without detecting input) to first region 608 instead of uncategorized region 614 in accordance with a determination that "Lettuce" corresponds to first region 608. In some examples, items are automatically added to user-created categories. In such examples, the user-created categories can be defined to include certain types of items and/or computer system 600 can learn what types of items correspond to the user-created categories when items are placed in the user-created categories.

As illustrated in FIG. 6B, after adding item 608*e* to first region 608, computer system 600 continues to display done icon 604*e*, detail icon 620, and text insertion indicator 622. In some examples, in response to detecting input directed to done icon 604*c*, computer system 600 ceases to display done icon 604*c*, keyboard 618, detail icon 620, and/or and text insertion indicator 622. At FIG. 6B, computer system 600 detects tap input 605*b* directed to (e.g., corresponding to the selection of) text entry field 610*c*.

In some examples, in response to detecting tap input 605*b*, computer system 600 performs one or more operations, including one or more operations described above with respect to detecting tap input 605*a*1. For example, in response to detecting tap input 605*b*, computer system 600 maintains display of keyboard 618, ceases to display text insertion indicator 622 in item 608*c*, displays text insertion indicator 622 at a left side of text entry field 610*c*, and/or displays a detail icon (e.g., with a visual appearance similar to detail icon 620) in text entry field 610*c*. In some examples, in response to detecting tap input 605*b*, computer system 600 scrolls grocery list user interface 602 such that text entry field 610*e* is displayed at a different location, such as higher up in a displayed area (e.g., as illustrated in FIG. 6C, with a portion of first region 608 no longer visible).

In some examples, after detecting tap input 605*b* and while focus is on text entry field 610*c* (e.g., text insertion indicator 622 is displayed in text entry field 610*e*), computer system 600 detects one or more inputs corresponding to selection of one or more characters and a request to add the one or more characters as an item to text entry field 610*e*. For example, computer system 600 detects one or more inputs corresponding to a request to add "Bananas" to second region 610 via text entry field 610*c*. As illustrated in FIG. 6C, as a result of adding "Bananas" to second region 610 via text entry field 610*e*, computer system 600 displays item 610*f* in second region 610.

In some examples, in response to and/or after item 610*f* is added to second region 610, a determination is made whether item 610*f* corresponds to second region 610. In such examples, the determination can include whether item 610*f* corresponds to another region of grocery list user interface 602. In some examples, the determination is performed in response to detecting an item is added directly to a region via a text entry field of the region.

As illustrated in FIG. 6C, in accordance with a determination that item 610*f* corresponds to first region 608, computer system 600 displays notification 624. In some examples, notification 624 is displayed proximate to and/or with item 610*f*. In other examples, notification 624 is displayed at a different location, such as at a top and/or bottom of a displayed area of grocery list user interface 602. As illustrated in FIG. 6C, notification 624 includes an indication (e.g., "Should this item "Bananas" be in the "Produce" category") that item 610*f* has been determined to correspond to first region 608. In some examples, notification 624 includes one or more controls for selecting whether to automatically move item 610*f* to first region 608. As illustrated in FIG. 6C, notification 624 includes yes control 624*a* and no control 624*b*. In some examples, in response to detecting input directed to yes control 624*a*, computer system 600 moves item 610*f* to first region 608. In some examples, in response to detecting input directed to no control 624*b*, computer system 600 does not move item 610*f* to first region 608 and, instead, keeps item 610*f* in second region 610. In some examples, in response to detecting input directed to no control 624*b*, computer system 600 updates categorization criteria corresponding to the list of items such that future items matching item 610*f* will be automatically categorized into second region 610 and/or future items matching item 610*f* will not be suggested to be moved to first region 608 via a notification similar to notification 624. In some examples, if a user navigates away from grocery list user interface 602 and back to grocery list user interface 602, such as to view another list and/or another application, computer system 600 removes notification 624 from grocery list user interface 602. In some examples, removing notification 624 has no effect on future items matching item 610*f*. In other examples, removing notification 624 has a similar effect as described above when detecting input directed to no control 624*b*. In some examples, in response to detecting an input directed to 624*a* and/or 624*b*, computer system 600 ceases to display done icon 604*f*, keyboard 618, and/or text insertion indicator 622. At FIG. 6C, computer system 600 detects tap input 605*c* directed to (e.g., corresponding to the selection of) yes control 624*a*.

As illustrated in FIG. 6D, in response to detecting tap input 605*c*, computer system 600 ceases to display done icon 604*f*, item 610*f* in second region 610, keyboard 618, and text insertion indicator 622, and displays item 608*f* in first region 608. Notably, item 608*f* was automatically moved to first region 608 and was not manually dragged to a location corresponding to first region 608. In some examples, such automatic movement allows for computer system 600 to assist a user in categorizing items, particularly when the user happens to categorize an item incorrectly.

The remaining discussion of FIGS. 6D-6G illustrate examples of selecting items to be removed from categories and how display of such items can be affected. At FIG. 6D, computer system 600 detects tap input 605*d* directed to (e.g., corresponding to the selection of) check circle icon 608*e*1. In some examples, tap input 605*d* corresponds to a request to indicate that item 608 has been completed. It should be recognized that, in some examples, tap input 605*d* can correspond to other locations associated with item 608*e* to cause item 608*e* to be completed, such as another portion of item 608*c*.

FIGS. 6E-6F illustrate one example of what occurs in response to a request to indicate that item 608*e* has been completed. In particular, in response to a request to indicate that item 608*e* has been completed, computer system 600 updates an appearance of check circle icon 608*el* for a predetermined amount of time before removing display of item 608*c* (e.g., including check circle icon 608*e*1). FIGS. 6F-6G illustrate another example of what occurs in response to a request to indicate that item 608*e* has been completed. In particular, in response to a request to indicate that item 608*e* has been completed, computer system 600 does not update an appearance of check circle icon 608*el* and instead removes display of item 608*e*. It should be recognized that computer system 600 can use one or both (e.g., in different contexts) of these techniques to indicate that item 608*e* has been completed. For example, computer system 600 can update an appearance of check circle icon 608*el* in accordance with a determination that item 608*e* has been included in grocery list user interface 602 for more than a predefined period of time and remove display of item 608*e* (e.g., including check circle icon 608*e*1) without changing a visual appearance of check circle icon 608*cl* in accordance with a determination that item 608*e* has not been included in grocery list user interface 602 for more than the predefined period of time.

As illustrated in FIG. 6E, in response to detecting a request to indicate item 608 has been completed (e.g., tap input 605*d*), computer system 600 updates a visual appearance of check circle icon 608*el* (e.g., changes from an empty circle to a shaded circle with a check mark) to indicate that item 608*e* has been completed. It should also be recognized that changing the empty circle to a shaded circle with a check mark is one example of updating the visual appearance of check circle icon 608*e*1. In some examples, other updates can occur in addition to and/or instead of changing the empty circle to a shaded circle with a check mark to indicate that item 608*d* has been completed.

As illustrated in FIG. 6F, after updating the visual appearance of check circle icon 608*el* in response to detecting tap input 605*d*, computer system 600 removes display of item 608*e* from grocery list user interface 602 (e.g., without detecting an additional input). In some examples, items and/or text entry fields previously after item 608*e* are moved up in first region 608 in response to removing display of item 608*e*. For example, item 608*f* and text entry field 608*d* are displayed after item 608*c* in FIG. 6F. At FIG. 6F, computer system 600 detects tap input 605*f* directed to (e.g., corresponding to the selection of) check circle icon 612*b*1.

As illustrated in FIG. 6G, in response to detecting tap input 605*f*, computer system 600 updates display of grocery list user interface 602 to no longer include item 612*b*. In some examples, 612*b* is removed from display in response to detecting check circle icon 612*b*1 has been selected. As mentioned above, in some examples, check circle icon 612*b*1 is not updated to a different visual appearance in response to detecting tap input 605*f* but is rather removed from display. In some examples, when a region no longer includes an item, computer system 600 ceases displaying indications of the region. For example, in response to detecting tap input 605*f*, computer system 600 no longer displays third region 612. In other examples, when a region no longer includes an item, computer system 600 maintains display of the region (e.g., maintains display of category title indicator 612*a* and/or caret 612*x*). In some examples, when a region no longer includes an item though grocery list user interface 602 is configured to maintain display of empty regions, computer system 600 maintains display of the region (e.g., including a title of the region) but ceases to display a caret corresponding to the category. In such examples, when one or more items are added to a region that is empty, computer system 600 displays a caret corresponding to the region.

The remaining discussion of FIGS. 6G-6J illustrate an example of adding an item to uncategorized region 614, causing the item to be automatically added to a category in accordance with the item being determined to correspond to the category. At FIG. 6F, computer system 600 detects tap input 605*g* directed to new item control 616.

As illustrated in FIG. 6H, in response to detecting tap input 605*g*, computer system 600 focuses input to text entry field 614*b* of uncategorized region 614. In some examples, focusing input includes computer system 600 displaying a different portion of (e.g., scrolling) grocery list user interface 602 to display text entry field 614*b* and displaying text insertion indicator 622 at a left side of text entry field 614*b*, detail icon 620 at a right side of text entry field 614*b*, keyboard 618 on top of a bottom portion of grocery list user interface 602, and/or done control 604*c* in control region 604. At FIG. 6H, computer system 600 detects one or more inputs corresponding to a request to add one or more characters to text entry field 614*b* of uncategorized region 614 (e.g., "chic").

As illustrated in FIG. 6I, in response to detecting the one or more inputs corresponding to a request to add one or more characters to text entry field 614*b* of uncategorized region 614, computer system 600 displays the one or more characters in text entry field 614*b* of uncategorized region 614 (e.g., text entry field 614*b* includes display of "chic" in FIG. 6I). In some examples, in accordance with a determination that the one or more characters correspond to an item previously included in the list of items (e.g., "chicken" was previously included as item 612*b* in FIG. 6F), computer system 600 displays a representation (e.g., representation 626) of the item. As illustrated in FIG. 6I, representation 626 is included in a portion of keyboard 618. It should be recognized that, in some examples, representation 626 is included in a portion of grocery list user interface 602, such as above or below text entry field 614*b*, and/or as a notification on top of grocery list user interface 602. In some examples, as illustrated in FIG. 6I, content included with the previously included item is displayed in representation 626. For example, "dark meat" is included with "chicken" in representation 626. In some examples, other types of content are included in representation 626 from the previously included item, such as an image, a video, a media item, a link to a webpage, a document, and/or a calendar event. In some examples, some content corresponding to the previously included item is not displayed in representation 626. For example, an image that was added to the previously included item might not be displayed in representation 626. At FIG.

6I, computer system 600 detects tap input 605*i* directed to (e.g., corresponding to the selection of) representation 626.

As illustrated in FIG. 6J, in response to detecting tap input 605*i*, item 612*d* is added to third region 612. In some examples, item 612*d* is added to third region 612 as a result of a determination that item 612*d* corresponds to third region 612 (e.g., that an item corresponding to item 612*d* (e.g., item 612*b*) was previously included in third region 612). It should be recognized that a new item can be categorized from text entry field 614*b* of uncategorized region 614 to a category even though the new item has not previously been included in the list of items, as described above.

The remaining discussion of FIGS. 6J-6K illustrate an example of collapsing a region to hide items within the region. At FIG. 6J, computer system 600 detects tap input 605*j* directed to (e.g., corresponding to the selection of) caret 610*x* of second region 610.

As illustrated in FIG. 6K, in response to detecting tap input 605*j*, computer system 600 collapses second region 610, ceasing display of one or more items within second region 610 (e.g., item 610*b*, item 610*c*, and/or item 610*d*). In some examples, collapsing second region 610 allows for more items to concurrently be displayed in other regions (e.g., first region 608, third region 612, and/or uncategorized region 614).

The remaining discussion of FIGS. 6K-6N illustrate an example of moving a region from one location to another location. In some examples, moving the region causes items within the region to cease being displayed during movement and re-displayed at the other location in response to no longer detecting an input. At FIG. 6K, computer system 600 detects drag input 605*k* directed to (e.g., corresponding to the selection of) third region 612.

As illustrated in FIG. 6L, in response to detecting initiation of drag input 605*k*, computer system 600 ceases to display one or more items within third region 612 (e.g., item 612*d*) and displays condensed indication 612*e*. In some examples, condensed indication 612*e* is displayed at a location of drag input 605*k*. In some examples, condensed indication 612*e* includes one or more characters to identify condensed indication 612*e*. For example, as illustrated in FIG. 6K, condensed indication 612*e* includes "Meat and Cheese," the title of third region 612. As computer system 600 detects drag input 605*k* move around grocery list user interface 602, computer system 600 moves condensed indication 612*e* to continue to correspond to drag input 605*k*. At FIG. 6L, computer system 600 detects that drag input 605*k* moves to a new location in grocery list user interface 602.

As illustrated in FIG. 6M, in response to detecting drag input 605*k* at a new location in grocery list user interface 602, computer system 600 displays condensed indication 612*e* at the new location. In some examples, when condensed indication 612*e* is moved to a location between other regions of grocery list user interface 602, computer system 600 moves at least one of the other regions to make room for condensed indication 612*e* and/or third region 612. As illustrated in FIG. 6M, second region 610 has moved down to make room for third region 612. At FIG. 6L, computer system 600 no longer detects drag input 605*k*.

As illustrated in FIG. 6N, in response to no longer detecting drag input 605*k*, computer system 600 displays third region 612 at a location corresponding to where drag input 605*k* was no longer detected. In some examples, third region 612 is displayed in a state that third region 612 was before detecting drag input 605*k* (e.g., items within third region 612 will not be visible (e.g., collapsed) in response to no long detecting drag input 605*k* if the items were not visible before detecting drag input 605*k*) (e.g., items within third region 612 will be visible (e.g., not collapsed) in response to no longer detecting drag input 605*k* if the items were visible before detecting drag input 605*k*). For example, as illustrated in FIG. 6N, in response to no longer detecting drag input 605*k*, computer system 600 displays item 612*d*.

The remaining discussion of FIGS. 6N-6O illustrate an example of re-naming a region without changing automatic categorization criteria. At FIG. 6N, computer system 600 detects tap input 605*n* directed to (e.g., corresponding to the selection of) category title indicator 612*a* of third region 612.

In some examples, in response to detecting tap input 605*n*, computer system 600 causes category title indicator 612*a* to be able to be edited. For example, after detecting tap input 605*n* and while category title indicator 612*a* of third region 612 is able to be edited, computer system 600 can detect input to change category title indicator 612*a* (e.g., from "Meat and Cheese" to "Cheese"). After changing category title indicator 612*a*, categorization criteria for third region 612 might not be changed. For example, if an item corresponding to meat would be automatically categorized into third region 612 before changing category title indicator 612*a* to "Cheese," computer system 600 would still automatically categorize the item into third region 612 after changing category title indicator 612*a* to "Cheese." As illustrated in FIG. 6O, item 612*d* (e.g., "Chicken") is still categorized to be included in third region 612 after changing category title indicator 612*a* to "Cheese."

The remaining discussion of FIGS. 6O-6Q illustrate an example of changing an organization of a list of items. At FIG. 6O, computer system 600 detects tap input 6050 directed to (e.g., corresponding to the selection of) options control 604*d*.

As illustrated in FIG. 6P, in response to detecting tap input 6050, computer system 600 displays options menu 628. In some examples, options menu 628 includes a set of one or more options corresponding to the application, the list of items, and/or grocery list user interface 602. As illustrated in FIG. 6P, options menu 628 includes, among others, hide option 625*a* and change option 625*b*. In some examples, in response to input directed to hide option 625*a*, computer system modifies a setting of grocery list user interface 602 to no longer hide items that have been marked as completed. For example, when an input is directed to a check circle icon, computer system 600 causes the check circle icon to change appearance (e.g., as described above) but will not cause an item corresponding to the check circle icon to cease being displaying based on time passing. At FIG. 6P, computer system 600 detects tap input 605*p* directed to (e.g., corresponding to the selection of) change option 625*b*.

As illustrated in FIG. 6Q, in response to detecting tap input 605*p*, computer system 600 changes a mode of the list of items in grocery list user interface 602 to no longer be categorized and/or automatically categorized. In some examples, in response to detecting tap input 605*p*, computer system 600 ceases to display indications of categories (e.g., category title indicator 608*a* and/or text entry field 608*d*) and displays items in the list of items in order of when they were input. For example, item 630*g* (e.g., "Chicken," corresponding to item 612*d*) was last to be input and is at a terminal position (e.g., at the end) of the list of items. It should be recognized that other orders can be used and that order of when items were input is just one example. In some examples, in response to detecting one or more inputs, the mode of the list of items is changed back to being automatically categorized. In such examples, in response to detecting the one or more inputs, computer system 600 displays the list of items separated into different regions (e.g., as illustrated in FIG. 6O and described above). FIG. 7 is a flow diagram illustrating a method (e.g., method 700) for managing a list of items in accordance with some examples. Some operations in method 700 are, optionally, combined, the orders of some operations are, optionally, changed, and some operations are, optionally, omitted.

As described below, method 700 provides an intuitive way for managing a list of items. Method 700 reduces the cognitive burden on a user for managing a list of items, thereby creating a more efficient human-machine interface. For battery-operated computing devices, enabling a user to manage a list of items faster and more efficiently conserves power and increases the time between battery charges.

In some examples, method 700 is performed at a computer system (e.g., 600) that is in communication with a display generation component (e.g., a display screen, a projector, and/or a touch-sensitive display) and one or more input devices (e.g., a physical input mechanism (e.g., a hardware input mechanism, a rotatable input mechanism, a crown, a knob, a dial, a physical slider, and/or a hardware button), a camera, a touch-sensitive display, a touch-sensitive surface, a microphone, a sensor (e.g., motion sensor, heart rate sensor, monitor, and/or antenna (e.g., using Bluetooth and/or Wi-Fi))). In some examples, the computer system is a phone, a watch, a tablet, a fitness tracking device, a wearable device, a television, a multi-media device, an accessory, a speaker, a head-mounted display (HMD), and/or a personal computing device.

At 702, the computer system displays, via the display generation component, a list of items (e.g., 608*b*, 608*c*, 610*b*, 610*c*, 610*d*, and/or 612*b*) (e.g., separated into multiple categories), wherein the list of items includes (at 704) one or more items (e.g., 608*b*, 608*c*, 610*b*, 610*c*, 610*d*, and/or 612*b*) assigned to a first category (e.g., 608, 610, 612, and/or 614) (e.g., a category that corresponds to food, cars, computer systems, and/or locations) and (at 706) one or more items (e.g., 608*b*, 608*c*, 610*b*, 610*c*, 610*d*, and/or 612*b*) assigned to a second category (e.g., 608, 610, 612, and/or 614) different from the first category. In some examples, displaying, via the display generation component, the list of items includes displaying a first category indication (e.g., 608*a*, 610*a*, and/or 612*a*) (e.g., a textual indication and/or a graphical indication) corresponding to the first category. In some examples, the first category is defined in response to detecting one or more inputs corresponding to a request to create the first category. In some examples, the first category is pre-defined such that a user of the computer system does not define the first category. In some examples, the list of items includes an indication of the first category. In some examples, the list of items does not include an indication of the first category and instead the first category is determined when displaying the list of items. In some examples, the list of items is separated into a single category. In some examples, the list of items includes a category corresponding to uncategorized items (e.g., one or more items that are not assigned to another category). In some examples, displaying, via the display generation component, the list of items includes displaying a second category indication (e.g., 608*a*, 610*a*, and/or 612*a*) corresponding to the second category. In some examples, the second category indication is different from the first category indication. In some examples, the second category is defined in response to detecting one or more inputs corresponding to a request to create the second category. In some examples, the second category is pre-defined such that a user of the computer system does not define the second category. In some examples, the list of items includes an indication of the second category. In some examples, the list of items does not include an indication of the second category and instead the second category is determined when displaying the list of items.

At 708, while displaying, via the display generation component, the list of items, the computer system detects, via the one or more input devices, a first set of one or more inputs (e.g., 605*i* and description with respect to FIGS. 6B-6C) (e.g., a tap input, a swipe input, a rotation of a rotatable input mechanism, a voice command, a hand input (e.g., an air tap and/or an air swipe) and/or one or more non-tap inputs, such as an air input (e.g., a pointing air gesture, a tapping air gesture, a swiping air gesture, and/or a moving air gesture), a gaze input, a gaze-and-hold input, a mouse click, a mouse click-and-drag, a voice command, a selection input, and/or an input that moves the computer system in a particular direction) corresponding to a request to add a first new item (e.g., an item not included in the list of items or a duplicate of an item included in the list of items) to a third category (e.g., 608, 610, and/or 612) (e.g., the first category, the second category, and/or a category different from the first category and the second category) (e.g., an item that corresponds to the third category or an item that does not correspond to the third category).

At 710, in response to detecting the first set of one or more inputs, (at 712) the computer system updates, via the display generation component, display of (and/or displaying) the list of items to include the first new item (e.g., 608*e* and/or 610*f*) in the third category (e.g., and not the first category and/or the second category). In some examples, updating display of the list of items to include the first new item in the third category occurs without displaying the first new item in the third category. In some examples, updating display of the list of items to include the first new item in the third category includes displaying a different portion of the list of items than was displayed while detecting the first set of one or more inputs. In some examples, updating display of the list of items to include the first new item in the third category includes displaying the first new item in an area corresponding to the third category.

At 710, in response to detecting the first set of one or more inputs and (at 714) in accordance with a determination that a first set of one or more criteria is satisfied (e.g., including the first new item in the third category breaks a rule that has been established for the list of items and/or for the third category, the first new item corresponds to an item that does not correspond to the third category, and/or the first new item is a duplicate of a respective item included in the list of items (and/or in another category of the list of items)), the computer system displays, via the display generation component, a control corresponding to the first new item (e.g., 624*a*) (e.g., the control is displayed at one or more locations that correspond to the first new item and/or the third category) (e.g., "suggested category is meat"). In some examples, in accordance with a determination that the first set of one or more criteria is not satisfied, the computer system forgoes displaying the control corresponding to the first new item.

At 716, while displaying the control corresponding to the first new item, the computer system detects a second set of one or more inputs (e.g., 605*c*) (e.g., a tap input, a swipe input, a rotation of a rotatable input mechanism, a voice command, a hand input (e.g., an air tap and/or an air swipe) and/or one or more non-tap inputs, such as an air input (e.g., a pointing air gesture, a tapping air gesture, a swiping air gesture, and/or a moving air gesture), a gaze input, a gaze-and-hold input, a mouse click, a mouse click-and-drag, a voice command, a selection input, and/or an input that moves the computer system in a particular direction) corresponding to selection of the control (e.g., 624*a*).

At 718, in response to detecting the second set of one or more inputs, the computer system updates, via the display generation component, display of the list of items to include the first new item (e.g., 608*f*) in a fourth category (e.g., 608, 610, 612, and/or 614) (e.g., the first category, the second category, and/or a category different from the first category and the second category) different from the third category without including the first new item in the third category. In some examples, the first category and the second category are categories of a single type of item. In some examples, the first category and the second category are categories of different types of items. In some examples, the computer system ceases to display the control corresponding to the first new item in response to detecting the second set of one or more inputs. In some examples, the computer system displays a first portion of the list before detecting the second set of one or more inputs and the computer system displays a second portion of the list different from the first portion after detecting the second set of one or more inputs. In some examples, the computer system displays a first portion of the list of items before the computer system displays the control corresponding to the first new item and the computer system displays a second portion of the list of items that is different from the first portion while the computer system displays the control corresponding to the first new item. In some examples, the computer system continues to display the list of items while the computer system displays the control corresponding to the first new item. In some examples, there is no overlap between the one or more items assigned to the first category and the one or more items assigned to the second category. In some examples, there is overlap between the one or more items assigned to the first category and the one or more items assigned to the second category. In some examples, updating display of the list of items to include the first new item in the fourth category includes ceasing to display the first new item in the third category. In some examples, updating display of the list of items to include the first new item in the fourth category includes displaying, via the display generation component, the first new item in an area corresponding to the fourth category. In some examples, updating display of the list of items to include the first new item in the fourth category includes displaying, via the display generation component, a different portion of the list of items than was displayed while detecting the second set of one or more inputs. Displaying a control corresponding to the first new item when a set of prescribed conditions are met allows the computer system to automatically perform a display operation that indicates to a user that the first new item might have been misplaced, thereby performing an operation when a set of conditions has been met without requiring further user input. Updating display of the list of items to include the first new item in a fourth category in response to detecting the second set of one or more inputs provides a user with visual feedback regarding the state of the computer system (e.g., the computer system detected the second set of one or more inputs) and with the ability to be notified and easily move items that are determined to be miscategorized, thereby providing improved visual feedback, reducing the number of inputs needed to perform an operation, and/or performing an operation when a set of conditions has been met without requiring further user input.

In some examples, displaying the list of items (e.g., 608*b*, 608*c*, 610*b*, 610*c*, 610*d*, and/or 612*b*) includes displaying a first field (e.g., 608*d*, 610*e*, and/or 612*c*) (e.g., a user interface element configured to receive and/or display text) (e.g., a placeholder field, item and/or cell, a blank field, item, and/or cell, and/or an empty field, item, and/or cell) that corresponds to the third category (e.g., 608, 610, 612, and/or 614) (e.g., the first text entry field is displayed in proximity to the third category and/or the first text entry field is displayed within an area corresponding to the third category). In some examples, in response to detecting at least a portion of the first set of one or more inputs (e.g., 605*a*, 605*b*, and/or 605*g*), the computer system displays a representation (e.g., 614*b*) (e.g., one or more characters, a textual representation, and/or a graphical representation) of the first new item in the first field that corresponds to the third category. In some examples, the computer system displays a representation of each of two or more numbers, symbols and/or characters as each input corresponding to selection of a number, symbol, and/or character is detected. In some examples, in response to detecting the first set of one or more inputs, the computer system ceases to display the representation of the first new item in the first text entry field as a part of updating display of the list of items to include the first new item in the third category. Displaying a representation of the first new item in the first text entry field in response to detecting at least a portion of the first set of one or more inputs provides the user with visual feedback regarding which characters the user has selected via the first set of one or more inputs and which category that the characters are being added to, thereby providing improved visual feedback, reducing the number of inputs needed to perform an operation, and/or providing additional control options.

In some examples, while displaying the control (e.g., 624*a*) corresponding to the first new item (e.g., 610*f*), the computer system detects a third set of one or more inputs (e.g., a tap input, a swipe input, a rotation of a rotatable input mechanism, a voice command, a hand input (e.g., an air tap and/or an air swipe) and/or one or more non-tap inputs, such as an air input (e.g., a pointing air gesture, a tapping air gesture, a swiping air gesture, and/or a moving air gesture), a gaze input, a gaze-and-hold input, a mouse click, a mouse click-and-drag, a voice command, a selection input, and/or an input that moves the computer system in a particular direction) that corresponds to a request to cease displaying the list of items (e.g., 608*b*, 608*c*, 610*b*, 610*c*, 610*d*, and/or 612*b*) (e.g., and cease the display of the control corresponding to the first new item). In some examples, in response to detecting the third set of one or more inputs, the computer system ceases displaying the list of items (e.g., and the control corresponding to the first new item). In some examples, after ceasing displaying the list of items and while the list of items is not displayed, the computer system detects a fourth set of one or more inputs (e.g., a tap input, a swipe input, a rotation of a rotatable input mechanism, a voice command, a hand input (e.g., an air tap and/or an air swipe) and/or one or more non-tap inputs, such as an air input (e.g., a pointing air gesture, a tapping air gesture, a swiping air gesture, and/or a moving air gesture), a gaze input, a gaze-and-hold input, a mouse click, a mouse click-and-drag, a voice command, a selection input, and/or an input that moves the computer system in a particular direction) corresponding to a request to display the list of items. In some examples, in response to detecting the fourth set of one or more inputs, the computer system displays the list of items without displaying the control corresponding to the first new item. In some examples, the computer system displays the list of items with the control corresponding to the first new item in response to detecting the fourth set of one or more inputs. In some examples, the computer system displays the control corresponding to the first new item at a respective position while the computer system detects the third set of one or more inputs and the computer system displays the control corresponding to the new category at the respective position in response to detecting the fourth set of one or more inputs. Displaying the list of items without displaying the control corresponding to the first new item in response to detecting the fourth set of one or more inputs while the list of items is not displayed provides the user with visual feedback regarding the present state of the computer system (e.g., the computer system detected the fourth set of one or more inputs and/or the computer system did not previously display the list of items) and a previous state of the computer system (e.g., the computer system did display the list of items while the computer system detected the fourth set of one or more inputs) and reduces user interface elements displayed with the list of items when user intent has indicated that a suggestion is not wanted, thereby providing improved visual feedback, reducing the number of inputs needed to perform an operation (e.g., not needing to explicitly dismiss the control), and/or performing an operation when a set of conditions has been met without requiring further user input.

In some examples, displaying the list of items (e.g., 608*b*, 608*c*, 610*b*, 610*c*, 610*d*, and/or 612*b*) includes displaying a collapse element (e.g., 606*x*, 610*x*, and/or 612*x*) (e.g., a carrot, a checkmark and/or a series of lines) (e.g., a minimize element) that corresponds to the first category (e.g., 608, 610, 612, and/or 614) (e.g., the collapse element is displayed in proximity to the first category and/or the collapse element is displayed within an area corresponding to the first category). In some examples, while displaying the list of items (e.g., 608*b*, 608*c*, 610*b*, 610*c*, 610*d*, and/or 612*b*) including the one or more items (e.g., 608*b*, 608*c*, 610*b*, 610*c*, 610*d*, and/or 612*b*) assigned to the first category (e.g., 608, 610, 612, and/or 614) and the one or more items (e.g., 608*b*, 608*c*, 610*b*, 610*c*, 610*d*, and/or 612*b*) assigned to the second category (e.g., 608, 610, 612, and/or 614), the computer system detects a fifth set of one or more inputs (e.g., 605*j* at FIG. 6J) (e.g., a tap input, a swipe input, a rotation of a rotatable input mechanism, a voice command, a hand input (e.g., an air tap and/or an air swipe) and/or one or more non-tap inputs, such as an air input (e.g., a pointing air gesture, a tapping air gesture, a swiping air gesture, and/or a moving air gesture), a gaze input, a gaze-and-hold input, a mouse click, a mouse click-and-drag, a voice command, a selection input, and/or an input that moves the computer system in a particular direction) corresponding to selection of the collapse element. In some examples, in response to detecting the fifth set of one or more inputs, the computer system updates, via the display generation component, display of the list of items to not include the one or more items assigned to the first category (e.g., 612*d*). In some examples, the list of items includes the one or more items assigned to the first category while the display of the list of items does not include the one or more items assigned to the first category. In some examples, display of the list of items includes the one or more items assigned to the second category while the display list of items does not include the one or more items assigned to the first category. In some examples, while the list of items is displayed without the one or more items assigned to the first category, in response to detecting a respective input that corresponds to selection of the collapse element, the computer system displays the list of items with the one or more items assigned to the first category. In some examples, the computer system changes the appearance of the collapse element in response to detecting the fifth set of one or more inputs. Updating display of the list of items to not include the one or more items assigned to the first category in response to detecting the fifth set of one or more inputs makes space available on the display of the computer system for the computer system to display additional information while providing a user with visual feedback regarding the state of the computer system (e.g., the computer system has detected the fifth set of one or more inputs), thereby providing improved visual feedback, reducing the number of inputs needed to perform an operation (e.g., not requiring as much scrolling), and/or performing an operation when a set of conditions has been met without requiring further user input.

In some examples, while the list of items (e.g., 608*b*, 608*c*, 610*b*, 610*c*, 610*d*, and/or 612*b*) includes the first new item (e.g., 632*g*, 632*h*, and/or 632*f*) in the fourth category (e.g., 608, 610, 612, and/or 614), the computer system detects a sixth set of one or more inputs (e.g., 605*d* and/or 605*f* at FIGS. 6D and/or 6F) (e.g., a tap input, a swipe input, a rotation of a rotatable input mechanism, a voice command, a hand input (e.g., an air tap and/or an air swipe) and/or one or more non-tap inputs, such as an air input (e.g., a pointing air gesture, a tapping air gesture, a swiping air gesture, and/or a moving air gesture), a gaze input, a gaze-and-hold input, a mouse click, a mouse click-and-drag, a voice command, a selection input, and/or an input that moves the computer system in a particular direction) corresponding to selection of the first new item (e.g., 632*g*, 632*h*, and/or 632*f*) of the fourth category. In some examples, in response to detecting the sixth set of one or more inputs, the computer system updates, via the display generation component, display of the list of items to not include the first new item in the fourth category (e.g., 602 at FIGS. 6F and/or 6G). In some examples, the computer system removes the first new item from the list of items in response to detecting the sixth set of one or more inputs. In some examples, the first new item remains in the list of items while the display of the list of items does not include the first new item. In some examples, the computer system displays a first portion of the list of items before detecting the sixth set of one or more inputs and the computer system displays a second portion of the list of items that is different than the first portion after the computer system detects the sixth set of one or more inputs. Updating the display of the list of items to not include the first new item in the fourth category in response to detecting the sixth set of one or more inputs allows the user to control what is displayed, dismiss user interface elements that are no longer need, and/or make space available on the display of the computer system for the computer system to display additional information while providing a user with visual feedback regarding the state of the computer system (e.g., the computer system has detected the sixth set of one or more inputs), thereby providing improved visual feedback, reducing the number of inputs needed to perform an operation, providing additional control options without cluttering the user interface with additional displayed controls, and/or performing an operation when a set of conditions has been met without requiring further user input.

In some examples, while the list of items (e.g., 608*b*, 608*c*, 610*b*, 610*c*, 610*d*, and/or 612*b*) includes the first new item (e.g., 632*g*, 632*h*, and/or 632*f*) in the fourth category (e.g., 608, 610, 612, and/or 614), the computer system detects a seventh set of one or more inputs (e.g., 605*d* and/or 605*f* at FIGS. 6D and/or 6F) (e.g., a tap input, a swipe input, a rotation of a rotatable input mechanism, a voice command, a hand input (e.g., an air tap and/or an air swipe) and/or one or more non-tap inputs, such as an air input (e.g., a pointing air gesture, a tapping air gesture, a swiping air gesture, and/or a moving air gesture), a gaze input, a gaze-and-hold input, a mouse click, a mouse click-and-drag, a voice command, a selection input, and/or an input that moves the computer system in a particular direction) corresponding to selection of the first new item. In some examples, in response to detecting the seventh set of one or more inputs, the computer system displays, via the display generation component, an indicator (e.g., 608*el* at FIG. 6E) (e.g., a selection indication, a check mark, and/or an indication of being selected) at one or more locations (e.g., 608*el*) (e.g., overlaid on, above, to the side, below, adjacent to) corresponding to the first new item (e.g., and not at one or more locations corresponding to the one or more items assigned to the first category and/or the one or more items assigned to the second category). In some examples, the computer system displays the first new item with a first state before detecting the seventh set of one or more inputs and the computer system displays the first new item with a second state after detecting the seventh set of one or more inputs. In some examples, the computer system ceases to display the indicator at one or more locations that corresponds to the first new item in response to detecting a respective input. In some examples, the computer system automatically (e.g., without intervening user input) updates the display of the list of items to not include the first new item after a predetermined amount of time (1-60 seconds) has elapsed since the computer system detected the seventh set of one or more inputs. Displaying an indicator at one or more locations corresponding to the first new item in response to detecting a seventh set of one or more inputs corresponding to selection of the first new item provides a user with visual feedback with respect to which respective item in the list of items is currently selected, marked as finished, and/or indicated to be deleted, thereby providing improved visual feedback, reducing the number of inputs needed to perform an operation (e.g., not requiring separate inputs to mark as finished and indicated to be deleted), providing additional control options without cluttering the user interface with additional displayed controls, and/or performing an operation when a set of conditions has been met without requiring further user input.

In some examples, while the list of items (e.g., 608*b*, 608*c*, 610*b*, 610*c*, 610*d*, and/or 612*b*) includes the first new item (e.g., 632*g*, 632*h*, and/or 632*f*) in the fourth category (e.g., 608, 610, 612, and/or 614), the computer system detects a first request (e.g., as discussed above in FIG. 6G) (e.g., a tap input, a swipe input, a rotation of a rotatable input mechanism, a voice command, a hand input (e.g., an air tap and/or an air swipe) and/or one or more non-tap inputs, such as an air input (e.g., a pointing air gesture, a tapping air gesture, a swiping air gesture, and/or a moving air gesture), a gaze input, a gaze-and-hold input, a mouse click, a mouse click-and-drag, a voice command, a selection input, and/or an input that moves the computer system in a particular direction) to remove the first new item from the fourth category (e.g., 605*f* at FIG. 6F). In some examples, the first request to remove the first new item from the fourth category is and/or includes selection of the first new item, as described above. In some examples, in response to detecting the first request to remove the first new item from the fourth category and in accordance with a determination that the fourth category does not include an additional item assigned to the fourth category other than the first new item (e.g., as discussed above at FIG. 6G) (e.g., the first new item is the only item assigned (e.g., item assigned by a respective user, by the computer system, and/or by an external computer) to the fourth category), the computer system updates, via the display generation component, display of the list of items to not include the fourth category (e.g., 602 at FIG. 6G) (e.g., and removing the first new item from the fourth category). In some examples, the list of items includes the fourth category while the display of the list of items does not include the fourth category. In some examples, the computer system displays a first portion of the list of items before detecting the first request to remove the first new item from the fourth category and the computer system displays a second portion different from the first portion of the list after the computer system detects the first request to remove the first new item from the fourth category. In some examples, the list of items includes the first new item while the display of the list of items does not include the fourth category. Updating the display of the list of items to not include the fourth category in response to detecting the request to remove the first new item and based on whether additional items are assigned to the fourth category allows the computer system to automatically perform a display operation that indicates to a user the number of items that are assigned to a respective category in the list of items, thereby performing an operation when a set of conditions has been met without requiring further user input.

In some examples, while the list of items (e.g., 608*b*, 608*c*, 610*b*, 610*c*, 610*d*, and/or 612*b*) includes the first new item (e.g., 632*g*, 632*h*, and/or 632*f*) in the fourth category (e.g., 608, 610, 612, and/or 614), the computer system detects a second request (e.g., as discussed above in FIG. 6G) (e.g., a tap input, a swipe input, a rotation of a rotatable input mechanism, a voice command, a hand input (e.g., an air tap and/or an air swipe) and/or one or more non-tap inputs, such as an air input (e.g., a pointing air gesture, a tapping air gesture, a swiping air gesture, and/or a moving air gesture), a gaze input, a gaze-and-hold input, a mouse click, a mouse click-and-drag, a voice command, a selection input, and/or an input that moves the computer system in a particular direction) to remove the first new item from the fourth category. In some examples, in response to detecting the second request to remove the first new item from the fourth category and in accordance with a determination that the fourth category does not include an additional item assigned to the fourth category other than the first new item (e.g., as discussed above at FIG. 6G) (e.g., the first new item is the only item assigned (e.g., item assigned by the list of items by a respective user, by the computer system, and/or by an external computer) to the fourth category), the computer system updates, via the display generation component, display of the list of items to include the fourth category without the first new item (e.g., 614 at FIG. 6G). In some examples, the computer system removes the first new item from the list of items in response to detecting the second request to remove the first new item. In some examples, the computer system displays a first portion of the list of items before detecting the second request to remove the first new item from the fourth category and the computer system displays a second portion different from the first portion of the list after the computer system detects the second request to remove the first new item from the fourth category. Updating the display of the list of time to include the fourth category without the first new item in response to detecting the second request to remove the first new item from the fourth category allows the computer system to maintain an area in the list of items that can be used to assign new items to a respective category, thereby performing an operation when a set of conditions has been met without requiring further user input.

In some examples, while displaying the list of items (e.g., 608*b*, 608*c*, 610*b*, 610*c*, 610*d*, and/or 612*b*) including the one or more items (e.g., 632*a*, 632*b*, 632*c*, 632*d*, 632*e*, and/or 632*f*) assigned to the first category (e.g., 608, 610, 612, and/or 614) and the one or more items (e.g., 632*a*, 632*b*, 632*c*, 632*d*, 632*e*, and/or 632*f*) assigned to the second category (e.g., 608, 610, 612, and/or 614), the computer system detects an eighth set of one or more inputs (e.g., 605*k* at FIG. 6K) (e.g., a tap input, a swipe input, a rotation of a rotatable input mechanism, a voice command, a hand input (e.g., an air tap and/or an air swipe) and/or one or more non-tap inputs, such as an air input (e.g., a pointing air gesture, a tapping air gesture, a swiping air gesture, and/or a moving air gesture), a gaze input, a gaze-and-hold input, a mouse click, a mouse click-and-drag, a voice command, a selection input, and/or an input that moves the computer system in a particular direction) corresponding to a request to move a position (e.g., location of 608*a*, 610*a*, 612*a*, and/or 614*a*) (e.g., a relative position and/or order) of the first category with respect to a position (e.g., a relative position and/or order) of the second category (e.g., the first category is moved above or below the second category). In some examples, while detecting at least a portion of the eighth set of one or more inputs, the computer system updates, via the display generation component, the display of the list of items to not include the one or more items assigned to the first category (e.g., 602 at FIG. 6L) (e.g., the computer system collapses the display of the one or more items assigned to the first category while the computer system detects the eighth set of one or more inputs) (e.g., while the display of the list of items includes the one or more items assigned to the second category). In some examples, in response to detecting the end of the eighth set of one or more inputs, the computer system reorders the first category and the second category. In some examples, in response to detecting the end of the eighth set of one or more inputs, the computer system updates the display of the list to include the one or more items assigned to the first category. In some examples, the computer system does not update the one or more items assigned to the second category while detecting the eighth set of one or more inputs. Updating the display of the list of items to not include the one or more items assigned to the first category while detecting at least a portion of the eighth set of one or more inputs makes space available on the display of the computer system for the computer system to display additional information while providing a user with visual feedback regarding the state of the computer system (e.g., the computer detects a portion of the eighth set of one or more inputs), thereby providing improved visual feedback, reducing the number of inputs needed to perform an operation (e.g., not requiring as much scrolling), providing additional control options without cluttering the user interface with additional displayed controls (e.g., automatically minimizing the one or more items assigned to the first category), and/or performing an operation when a set of conditions has been met without requiring further user input.

In some examples, while displaying the list of items (e.g., 608*b*, 608*c*, 610*b*, 610*c*, 610*d*, and/or 612*b*) with the one or more items (e.g., 632*a*, 632*b*, 632*c*, 632*d*, 632*e*, and/or 632*f*) assigned to the first category (e.g., 608, 610, 612, and/or 614) and the one or more items (e.g., 632*a*, 632*b*, 632*c*, 632*d*, 632*c*, and/or 632*f*) assigned to the second category (e.g., 608, 610, 612, and/or 614), the computer system detects a ninth set of one or more inputs (e.g., 618 at FIG. 6H) (e.g., a tap input, a swipe input, a rotation of a rotatable input mechanism, a voice command, a hand input (e.g., an air tap and/or an air swipe) and/or one or more non-tap inputs, such as an air input (e.g., a pointing air gesture, a tapping air gesture, a swiping air gesture, and/or a moving air gesture), a gaze input, a gaze-and-hold input, a mouse click, a mouse click-and-drag, a voice command, a selection input, and/or an input that moves the computer system in a particular direction) corresponding to input of a set of one or more characters (e.g., location of 614*b* at FIG. 6I) in a fourth text entry field (e.g., 608*c*, 610*e*, and/or 614*b*). In some examples, the fourth text entry field corresponds to a respective category of the list of items. In some examples, the fourth text entry field does not correspond to a request category of the list of items. In some examples, the fourth text entry field corresponds to an uncategorized area of the list of items. In some examples, in response to detecting the ninth set of one or more inputs and in accordance with a determination that the set of one or more characters corresponds to a previous item (e.g., the set of one or more characters is an incomplete spelling of the previous new item and/or an incomplete dictation of the previous item) (e.g., an amount of characters entered is above a threshold number of characters and/or a confidence level that the set of one or more characters corresponds to the previous item is above a threshold) that was previously included (e.g., 612*b* at FIGS. 6D, 6E, and/or 6F) (e.g., within a threshold amount of time (e.g., 1-60 days), previously input by the user of the computer system, and/or previously automatically included by the computer system) in the list of items (e.g., as discussed above at FIGS. 6H and 6I), the computer system displays a representation of the previous item (e.g., 626). In some examples, in response to detecting the ninth set of one or more inputs and in accordance with a determination that the set of one or more characters does not correspond to the previous item, the computer system forgoes displaying the presentation of the previous item. In some examples, the representation of the previous item is displayed at one or more positions that correspond to the fourth text entry field. In some examples, the representation of the previous item includes one or more characters corresponding to the previous item. In some examples, the representation of the previous item includes one or more attachments and/or user-interface elements (e.g., images, videos, and/or documents) that were previously included with the previous item. In some examples, the representation of the previous item does not include the one or more attachments and/or user-interface elements. In some examples, while displaying the representation of the previous item, the computer system detects a tenth set of one or more inputs (e.g., 605*i*) (e.g., a tap input, a swipe input, a rotation of a rotatable input mechanism, a voice command, a hand input (e.g., an air tap and/or an air swipe) and/or one or more non-tap inputs, such as an air input (e.g., a pointing air gesture, a tapping air gesture, a swiping air gesture, and/or a moving air gesture), a gaze input, a gaze-and-hold input, a mouse click, a mouse click-and-drag, a voice command, a selection input, and/or an input that moves the computer system in a particular direction) corresponding to selection of the representation of the previous item (e.g., 626). In some examples, in response to detecting the tenth set of one or more inputs, the computer system updates, via the display generation component, display of the list of items to include the previous item (e.g., 612*b* at FIGS. 6J and/or 6K) (e.g., in a category of the list of items or in an uncategorized area of the list of items), wherein display of the previous item in the list of items includes a graphical representation (e.g., an image and/or an animation) of the previous item (e.g., 632*f* at 6J) (e.g., before detecting the ninth set of one or more inputs and/or when the previous item was previously included in the list of items). Displaying a representation of the previous item based on whether the item was previously included in the list of items allows the computer system to automatically perform a display operation that indicates to a user whether a respective item was previously included in the list of items, thereby performing an operation when a set of conditions has been met without requiring further user input. Updating display of the list of items to include the previous item with a graphical representation of the previous item allows the computer system to group information together that was previously grouped together and not require a user to re-add all of the information previously provided any time an item is re-added, thereby reducing the number of inputs needed to perform an operation and/or performing an operation when a set of conditions has been met without requiring further user input.

In some examples, the list of items (e.g., 608*b*, 608*c*, 610*b*, 610*c*, 610*d*, and/or 612*b*) includes a fifth text entry field (e.g., 618 at FIGS. 6H and/or 6I) (e.g., a user interface element configured to receive and/or display text) positioned adjacent (e.g., and/or ordered after) to a respective category (e.g., 608, 610, 612, and/or 614) (e.g., the respective category is positioned at the end of the list of items and/or at a terminal position of the list of items). In some examples, while displaying, via the display generation component, the list of items, the computer system detects, via the one or more input devices, an eleventh set of one or more inputs (e.g., 605*a*, 605*b*, and/or 605*g*) (e.g., a tap input, a swipe input, a rotation of a rotatable input mechanism, a voice command, a hand input (e.g., an air tap and/or an air swipe) and/or one or more non-tap inputs, such as an air input (e.g., a pointing air gesture, a tapping air gesture, a swiping air gesture, and/or a moving air gesture), a gaze input, a gaze-and-hold input, a mouse click, a mouse click-and-drag, a voice command, a selection input, and/or an input that moves the computer system in a particular direction) corresponding to a request to add a second new item (e.g., 632*g*, 632*h*, and/or 632*f*) (e.g., an item not included in the list of items or a duplicate of an item included in the list of items), different (e.g., different type of item and/or an item automatically assigned to a different category) from the first new item, to the list of items, wherein the eleventh set of one or more inputs corresponds to the fifth text entry field. In some examples, in response to detecting the eleventh set of one or more inputs and in accordance with a determination that the second new item corresponds to the first category (e.g., and not the respective category, the second category, the third category, and/or the fourth category), the computer system updates, via the display generation component, the list of items to include the second new item in the first category (e.g., and not the respective category, the second category, the third category, and/or the fourth category). In some examples, in response to detecting the eleventh set of one or more inputs and in accordance with a determination that the second new item corresponds to the second category (e.g., 608, 610, 612, and/or 614) (e.g., and not the respective category, the first category, the third category, and/or the fourth category), the computer system updates, via the display generation component, the list of items to include the second new item in the second category (e.g., and not the respective category, the first category, the third category, and/or the fourth category). In some examples, the second new item and the first new item are the same type of item. In some examples, the second new item and the first new item are assigned to the same category. Updating the list of items to include the second new item in a respective category based on whether prescribed conditions are satisfied allows the computer system to automatically perform a display operation that indicates to a user which respective category the second new item belongs to, thereby performing an operation when a set of conditions has been met without requiring further user input.

In some examples, while displaying, via the display generation component, the list of items (e.g., 608*b*, 608*c*, 610*b*, 610*c*, 610*d*, and/or 612*b*) and before detecting the eleventh set of one or more inputs (e.g., 605*a*, 605*b*, and/or 605*g*), the computer system displays, via the display generation component, a control to add a new item to the list of items (e.g., 616). In some examples, while displaying the control to add a new item to the list of items, the computer system detects an input (e.g., a tap input, a swipe input, a rotation of a rotatable input mechanism, a voice command, a hand input (e.g., an air tap and/or an air swipe) and/or one or more non-tap inputs, such as an air input (e.g., a pointing air gesture, a tapping air gesture, a swiping air gesture, and/or a moving air gesture), a gaze input, a gaze-and-hold input, a mouse click, a mouse click-and-drag, a voice command, a selection input, and/or an input that moves the computer system in a particular direction) directed to the control to add a new item to the list of items (e.g., 605*g*). In some examples, in response to detecting the input directed to the control to add a new item to the list of items, the computer system focuses input to the fifth text entry field (e.g., location of 622 at FIG. 6H), such that one or more characters detected, via the one or more input devices, while focusing input to the fifth text entry field, are added to the fifth text entry field, wherein the eleventh set of one or more inputs (e.g., located on 618 at FIGS. 6H and/or 6I) includes one or more inputs corresponding to selection of one or more characters to be added to the fifth text entry field (e.g., as discussed above at FIGS. 6H and 6I). In some examples, focusing input to the fifth text entry field includes displaying a cursor and/or a text entry indicator in the fifth text entry field. In some examples, the computer system displays the one or more characters in the fifth text entry field in response to detecting the one or more inputs corresponding to selection of the one or more characters. In some examples, the computer system updates the list of items to no longer include the one or more characters in the fifth text entry field in response to detecting the eleventh set of one or more inputs.

In some examples, while the list of items (e.g., 608*b*, 608*c*, 610*b*, 610*c*, 610*d*, and/or 612*b*), including the one or more items (e.g., 608*b*, 608*c*, 610*b*, 610*c*, 610*d*, and/or 612*b*) assigned to the first category (e.g., 608, 610, 612, and/or 614) and the one or more items (e.g., 608*b*, 608*c*, 610*b*, 610*c*, 610*d*, and/or 612*b*) assigned to the second category (e.g., 608, 610, 612, and/or 614), is in a first order (e.g., as discussed above in FIG. 6A) (e.g., an order where one or more items assigned to the first category and one or more items assigned the second category are not blended and/or merged) (e.g., that is not based on chronology) (e.g., the first order is based on category, price of item, which user added the item, importance and/or how common the item is), the computer system detects a first input (e.g., 605*p*) (e.g., a tap input, a swipe input, a rotation of a rotatable input mechanism, a voice command, a hand input (e.g., an air tap and/or an air swipe) and/or one or more non-tap inputs, such as an air input (e.g., a pointing air gesture, a tapping air gesture, a swiping air gesture, and/or a moving air gesture), a gaze input, a gaze-and-hold input, a mouse click, a mouse click-and-drag, a voice command, a selection input, and/or an input that moves the computer system in a particular direction) corresponding to a first request to reorder the list of items (e.g., as discussed above at FIG. 6A). In some examples, in response to detecting the first input corresponding to the first request to reorder the list of items, the computer system displays, via the display generation component, the list of items such that the one or more items assigned to the first category and the one or more items assigned to the second category are in a second order (e.g., 630*a*-630*g*) (e.g., an order where one or more items assigned to the first category and one or more items assigned the second category are blended and/or merged) different from the first order (e.g., the second order is based on chronology) (e.g., when each respective item was added to the list of items (e.g., the most recently added item is at the top of the list of items or the most recently added item is at the bottom of the list of items) or when each respective item was last edited by a user and/or computer system) (e.g., the second order is not based on categories). In some examples, in response to detecting the first input corresponding to the first request to reorder the list of items, the computer system ceases displaying indications of respective categories. In some examples, in response to detecting the first input corresponding to the first request to reorder the list of items, the computer system ceases displaying category divider elements. In some examples, the first order or the second order is a default order. Displaying the list of items such that the one or more items assigned to the first category and the one or more items assigned to the second category are in a second order in response to detecting an input while the one or more items assigned to the first category and the one or more items assigned to the second category are in a second order allows the user to visually inspect the list of items while the one or more items assigned to the first category and the one or more items assigned to the second category are in a first order and/or a second order and the user to change what data is being displayed (e.g., in the first order, information related to categorization is displayed by the first order and, in the second order, information related to when items were added is displayed by the second order), thereby providing improved visual feedback and/or performing an operation when a set of conditions has been met without requiring further user input.

In some examples, while the list of items (e.g., 608*b*, 608*c*, 610*b*, 610*c*, 610*d*, and/or 612*b*), including the one or more items (e.g., 608*b*, 608*c*, 610*b*, 610*c*, 610*d*, and/or 612*b*) assigned to the first category (e.g., 608, 610, 612, and/or 614) and the one or more items assigned to the second category (e.g., 608, 610, 612, and/or 614), is in the second order, the computer system detects a second input (e.g., as discussed above with respect to FIG. 6Q) (e.g., a tap input, a swipe input, a rotation of a rotatable input mechanism, a voice command, a hand input (e.g., an air tap and/or an air swipe) and/or one or more non-tap inputs, such as an air input (e.g., a pointing air gesture, a tapping air gesture, a swiping air gesture, and/or a moving air gesture), a gaze input, a gaze-and-hold input, a mouse click, a mouse click-and-drag, a voice command, a selection input, and/or an input that moves the computer system in a particular direction) corresponding to a second request to reorder the list of items. In some examples, in response to detecting the second input corresponding to the second request to reorder the list of items, the computer system displays, via the display generation component, the list of items such that the one or more items assigned to the first category and the one or more items assigned to the second category are in a third order (e.g., as discussed above at FIG. 6A) (e.g., an order where one or more items assigned to the first category and one or more items assigned the second category are not blended and/or merged) different from the second order, wherein the third order corresponds to an order based on categories of items (e.g., categories defined by the computer system and/or categories defined by the user) (e.g., the one or more items assigned to the first category and the one or more items assigned to the second category are placed in their respective category). In some examples, the third order and the first order are the same. In some examples, in response to detecting the thirteenth set of one or more inputs, the computer system displays indications of the respective categories included in the third order. Displaying the list of items such that the one or more items assigned to the first category and the one or more items assigned to the second category are in a third order that corresponds to an order based on categories of items allows the user to visually inspect the list of items to determine the number of different categories that are included in the list of items and the number of items that are included in each respective category, thereby providing improved visual feedback and/or performing an operation when a set of conditions has been met without requiring further user input.

In some examples, while displaying the list of items (e.g., 608*b*, 608*c*, 610*b*, 610*c*, 610*d*, and/or 612*b*), the computer system detects a request to add a third new item (e.g., 632*g*, 632*h*, and/or 632*f*) to the list of items. In some examples, in response to detecting the request to add the third new item and in accordance with a determination that the list of items is a shared list (e.g., as discussed above at FIG. 6A) (e.g., shared between the computer system and the external computer system, shared between respective users, and/or shared between a user account that corresponds to the computer system and a user account that corresponds to the external computer system), that the list of items is subject to a first set of rules (e.g., as discussed above at FIG. 6A) (e.g., governed by and/or is subject to the first set of rules) (e.g., a computer generated set of rules or a user generated set of rules) (e.g., a set of rules that govern the categorization of items in the respective categories of the list of items and/or a set of rules that govern how the respective items are placed in the respective categories of the items) of (e.g., from, defined by, and/or set using) a first external computer system (e.g., as discussed above at FIG. 6A) (e.g., generated by the external computer system, generated by a user of the first external computer system, and/or generated by a user account that corresponds to the first external computer system), and that the third new item corresponds to a fifth category according to the first set of rules, the computer system updates display of the list of items to include the third new item in the fifth category (e.g., 608, 610, 612, and/or 614) (e.g., the first set of rules link the third new item to the fifth category and/or the first set of rules categorize the third new item within the fifth category). In some examples, the first external computer system is a phone, a watch, a tablet, a fitness tracking device, a wearable device, a television, a multi-media device, an accessory, a speaker, a head-mounted display (HMD), and/or a personal computing device. In some examples, in response to detecting the request to add the third new item and in accordance with a determination that the list of items is a shared list (e.g., shared between the computer system and the external computer system, shared between respective users, and/or shared between a user account that corresponds to the computer system and a user account that corresponds to the external computer system), that the list of items is subject to a second set of rules (e.g., governed by and/or is subject to the second set of rules) (e.g., a computer generated set of rules or a user generated set of rules) (e.g., a set of rules that govern the categorization of items in the respective categories of the list of items and/or a set of rules that govern the how the respective items are placed in the respective categories of the items) of (e.g., from, defined by, and/or set using) a second external computer system (e.g., as discussed above at 6A) (e.g., generated by the second external computer system, generated by a user of the second external computer system, and/or generated by a user account that corresponds to the second external computer system) different from the first external computer system, and that the third new item corresponds to a sixth category (e.g., 608, 610, 612, and/or 614) according to the second set of rules, the computer system updates display of the list of items to include the third new item in the sixth category (e.g., the second set of rules link the third new item to the sixth category and/or the second set of rules categorize the third new item within the sixth category), wherein the sixth category is different from the fifth category. In some examples, the second external computer system is a phone, a watch, a tablet, a fitness tracking device, a wearable device, a television, a multimedia device, an accessory, a speaker, a head-mounted display (HMD), and/or a personal computing device. In some examples, in response to detecting the request to add the third new item and in accordance with a determination that the list of items is not a shared list (e.g., the list of items is exclusive to the computer system, the list of items is exclusive to a group of authorized users, the list of items is exclusive to a user, and/or the list of items is exclusive to a user account, and/or the list of items is exclusive to a list of authorized user accounts) (e.g., that the list of items is not subject to the first set of rules from the first external computer system (e.g., as a result of the list of items not being a shared list)) and that the third new item corresponds to a seventh category according to a third set of rules not corresponding to a respective external computer system (e.g., the third set of rules corresponds to the computer system), the computer system updates display of the list of items to include the third new item in the seventh category (e.g., a different type of category, includes different items and/or is created differently). In some examples, the seventh category is different from the fifth category and/or the sixth category. In some examples, when the list of items is not subject to the first set of rules from the first external computer system and/or the second set of rules from the second external computer system, the list of items is subject to the third set of rules that is generated by and/or corresponds to the computer system, a user of the computer system, and/or a group of users of the computer system. Updating a respective category of the list of items to include the third new item based on a set of rules allows the computer system to automatically perform a display operation that indicates which set of rules the list of items is subject to, thereby performing an operation when a set of conditions has been met without requiring further user input.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the management of lists of items or any other content that may be of interest to a user. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to recommend categories for items to be added. Accordingly, use of such personal information data enables users to have calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of managing lists of items, the present technology can be configured to allow users to select to "opt in" or "opt out" of participation in the collection of personal information data during registration for services or anytime thereafter. In another example, users can select not to provide list associated data for targeted content delivery services. In yet another example, users can select to limit the length of time that a list is maintained or entirely prohibit the development of a list data profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available about a user's list of items, or publicly available information.

What is claimed is:

1. A computer system that is in communication with a display generation component and one or more input devices, the computer system comprising:
- one or more processors; and
- memory storing one or more programs configured to be executed by the one or more processors, the one or more programs including instructions for:
  - displaying, via the display generation component, a list of items, wherein the list of items includes:
    - one or more items assigned to a first category; and
    - one or more items assigned to a second category different from the first category;
  - while displaying, via the display generation component, the list of items, detecting, via the one or more input devices, a first set of one or more inputs corresponding to a request to add a first new item to a third category;
  - in response to detecting the first set of one or more inputs:
    - updating dispay of, via the display generation component, the list of items to include the first new item in the third category; and
    - in accordance with a determination that a first set of one or more criteria is satisfied, displaying, via the display generation component, a control corresponding to the first new item;
  - while displaying the control corresponding to the first new item, detecting, via the one or more input devices, a second set of one or more inputs corresponding to selection of the control; and
  - in response to detecting the second set of one or more inputs, updating display of, via the display generation component, the list of items to include the first new item in a fourth category different from the third category without including the first new item in the third category.

2. The computer system of claim 1, wherein displaying the list of items includes displaying a first field that corresponds to the third category, and wherein the one or more programs further include instructions for:
- in response to detecting at least a portion of the first set of one or more inputs, displaying, via the display generation component, a representation of the first new item in the first field that corresponds to the third category.

3. The computer system of claim 1, wherein the one or more programs further include instructions for:
- while displaying the control corresponding to the first new item, detecting, via the one or input devices, a third set of one or more inputs that corresponds to a request to cease displaying the list of items;
- in response to detecting the third set of one or more inputs, ceasing display of, via the display generation component, the list of items;
- after ceasing display of the list of items and while the list of items is not displayed, detecting, via the one or more input devices, a fourth set of one or more inputs corresponding to a request to display the list of items; and
- in response to detecting the fourth set of one or more inputs, displaying, via the display generation component, the list of items without displaying the control corresponding to the first new item.

4. The computer system of claim 1, wherein displaying the list of items includes displaying a collapse element that corresponds to the first category, and wherein the one or more programs further include instructions for:
- while displaying the list of items including the one or more items assigned to the first category and the one or more items assigned to the second category, detecting, via the one or more input devices, a fifth set of one or more inputs corresponding to selection of the collapse element; and
- in response to detecting the fifth set of one or more inputs, updating display of, via the display generation component, the list of items to not include the one or more items assigned to the first category.

5. The computer system of claim 1, wherein the one or more programs further include instructions for:
- while the list of items includes the first new item in the fourth category, detecting, via the one or more input devices, a sixth set of one or more inputs corresponding to selection of the first new item of the fourth category; and in response to detecting the sixth set of one or more inputs, updating display of, via the display generation component, the list of items to not include the first new item in the fourth category.

6. The computer system of claim 1, wherein the one or more programs further include instructions for:

while the list of items includes the first new item in the fourth category, detecting, via the one or more input devices a seventh set of one or more inputs corresponding to selection of the first new item; and in response to detecting the seventh set of one or more inputs, displaying, via the display generation component, an indicator at one or more locations corresponding to the first new item.

7. The computer system of claim 1, wherein the one or more programs further include instructions for:

while the list of items includes the first new item in the fourth category, detecting, via the one or more input devices, a first request to remove the first new item from the fourth category;

and in response to detecting the first request to remove the first new item from the fourth category and in accordance with a determination that the fourth category does not include an additional item assigned to the fourth category other than the first new item, updating display of, via the display generation component, the list of items to not include the fourth category.

8. The computer system of claim 1, wherein the one or more programs further include instructions for:

while the list of items includes the first new item in the fourth category, detecting, via the one or more input devices, a second request to remove the first new item from the fourth category; and in response to detecting the second request to remove the first new item from the fourth category and in accordance with a determination that the fourth category does not include an additional item assigned to the fourth category other than the first new item, updating display of, via the display generation component, the list of items to include the fourth category without the first new item.

9. The computer system of claim 1, wherein the one or more programs further include instructions for:

while displaying the list of items including the one or more items assigned to the first category and the one or more items assigned to the second category, detecting, via the one or more input devices, an eighth set of one or more inputs corresponding to a request to move a position of the first category with respect to a position of the second category; and while detecting at least a portion of the eighth set of one or more inputs, updating display of, via the display generation component, the list of items to not include the one or more items assigned to the first category.

10. The computer system of claim 1, wherein the one or more programs further include instructions for:

while displaying the list of items with the one or more items assigned to the first category and the one or more items assigned to the second category, detecting, via the one or more input devices, a ninth set of one or more inputs corresponding to input of a set of one or more characters in a fourth text entry field;

in response to detecting the ninth set of one or more inputs and in accordance with a determination that the set of one or more characters corresponds to a previous item that was previously included in the list of items, displaying, via the display generation component, a representation of the previous item;

while displaying the representation of the previous item, detecting, via the one or more input devices, a tenth set of one or more inputs corresponding to selection of the representation of the previous item; and in response to detecting the tenth set of one or more inputs, updating display of, via the display generation component, the list of items to include the previous item, wherein display of the previous item in the list of items includes a graphical representation of the previous item.

11. The computer system of claim 1, wherein the list of items includes a fifth text entry field positioned adjacent to a respective category, and wherein the one or more programs further include instructions for:

while displaying, via the display generation component, the list of items, detecting, via the one or more input devices, an eleventh set of one or more inputs corresponding to a request to add a second new item, different from the first new item, to the list of items, wherein the eleventh set of one or more inputs corresponds to the fifth text entry field; and in response to detecting the eleventh set of one or more inputs:

in accordance with a determination that the second new item corresponds to the first category, updating display of, via the display generation component, the list of items to include the second new item in the first category; and in accordance with a determination that the second new item corresponds to the second category, updating display of, via the display generation component, the list of items to include the second new item in the second category.

12. The computer system of claim 11, wherein the one or more programs further include instructions for:

while displaying, via the display generation component, the list of items and before detecting the eleventh set of one or more inputs:

displaying, via the display generation component, a control to add a new item to the list of items; and while displaying the control to add a new item to the list of items, detecting, via the one or more input devices, an input directed to the control to add a new item to the list of items; and in response to detecting the input directed to the control to add a new item to the list of items, focusing input to the fifth text entry field, such that one or more characters detected, via the one or more input devices, while focusing input to the fifth text entry field, are added to the fifth text entry field, wherein the eleventh set of one or more inputs includes one or more inputs corresponding to selection of one or more characters to be added to the fifth text entry field.

13. The computer system of claim 1, wherein the one or more programs further include instructions for:

while the list of items, including the one or more items assigned to the first category and the one or more items assigned to the second category, is in a first order, detecting, via the one or more input devices, a first input corresponding to a first request to reorder the list of items; and in response to detecting the first input corresponding to the first request to reorder the list of items, displaying, via the display generation component, the list of items such that the one or more items assigned to the first category and the one or more items assigned to the second category are in a second order different from the first order.

14. The computer system of claim 13, wherein the one or more programs further include instructions for:

while the list of items, including the one or more items assigned to the first category and the one or more items assigned to the second category, is in the second order, detecting, via the one or more input devices, a second input corresponding to a second request to reorder the list of items; and in response to detecting the second input corresponding to the second request to reorder the list of items, displaying, via the display generation component, the list of items such that the one or more items assigned to the first category and the one or more items assigned to the second category are in a third order different from the second order, wherein the third order corresponds to an order based on categories of items.

15. The computer system of claim 1, wherein the one or more programs further include instructions for:

while displaying the list of items, detecting, via the one or more input devices, a request to add a third new item to the list of items;

in response to detecting the request to add the third new item:

in accordance with a determination that the list of items is a shared list, that the list of items is subject to a first set of rules of a first external computer system, and that the third new item corresponds to a fifth category according to the first set of rules, updating display of, via the one or more display generation components, the list of items to include the third new item in the fifth category; and in accordance with a determination that the list of items is a shared list, that the list of items is subject to a second set of rules of a second external computer system different from the first external computer system, and that the third new item corresponds to a sixth category according to the second set of rules, updating display of, via the one or more display generation components, the list of items to include the third new item in the sixth category, wherein the sixth category is different from the fifth category.

16. A non-transitory computer-readable storage medium storing one or more programs configured to be executed by one or more processors of a computer system that is in communication with a display generation component and one or more input devices, the one or more programs including instructions for:

displaying, via the display generation component, a list of items, wherein the list of items includes:

one or more items assigned to a first category; and one or more items assigned to a second category different from the first category;

while displaying, via the display generation component, the list of items, detecting, via the one or more input devices, a first set of one or more inputs corresponding to a request to add a first new item to a third category;

in response to detecting the first set of one or more inputs:

updating display of, via the display generation component, the list of items to include the first new item in the third category; and in accordance with a determination that a first set of one or more criteria is satisfied, displaying, via the display generation component, a control corresponding to the first new item;

while displaying the control corresponding to the first new item, detecting, via the one or more input devices, a second set of one or more inputs corresponding to selection of the control; and in response to detecting the second set of one or more inputs, updating display of, via the display generation component, the list of items to include the first new item in a fourth category different from the third category without including the first new item in the third category.

17. The non-transitory computer-readable storage medium of claim 16, wherein displaying the list of items includes displaying a first field that corresponds to the third category, and wherein the one or more programs further include instructions for:

in response to detecting at least a portion of the first set of one or more inputs, displaying, via the display generation component, a representation of the first new item in the first field that corresponds to the third category.

18. The non-transitory computer-readable storage medium of claim 16, wherein the one or more programs further include instructions for:

while displaying the control corresponding to the first new item, detecting, via the one or input devices, a third set of one or more inputs that corresponds to a request to cease displaying the list of items;

in response to detecting the third set of one or more inputs, ceasing display of, via the display generation component, the list of items;

after ceasing display of the list of items and while the list of items is not displayed, detecting, via the one or more input devices, a fourth set of one or more inputs corresponding to a request to display the list of items; and in response to detecting the fourth set of one or more inputs, displaying, via the display generation component, the list of items without displaying the control corresponding to the first new item.

19. The non-transitory computer-readable storage medium of claim 16, wherein displaying the list of items includes displaying a collapse element that corresponds to the first category, and wherein the one or more programs further include instructions for:

while displaying the list of items including the one or more items assigned to the first category and the one or more items assigned to the second category, detecting, via the one or more input devices, a fifth set of one or more inputs corresponding to selection of the collapse element; and in response to detecting the fifth set of one or more inputs, updating display of, via the display generation component, the list of items to not include the one or more items assigned to the first category.

20. The non-transitory computer-readable storage medium of claim 16, wherein the one or more programs further include instructions for:

while the list of items includes the first new item in the fourth category, detecting, via the one or more input devices, a sixth set of one or more inputs corresponding to selection of the first new item of the fourth category; and in response to detecting the sixth set of one or more inputs, updating display of, via the display generation component, the list of items to not include the first new item in the fourth category.

21. The non-transitory computer-readable storage medium of claim 16, wherein the one or more programs further include instructions for:

while the list of items includes the first new item in the fourth category, detecting, via the one or more input devices, a seventh set of one or more inputs corresponding to selection of the first new item; and in response to detecting the seventh set of one or more inputs, displaying, via the display generation component, an indicator at one or more locations corresponding to the first new item.

22. The non-transitory computer-readable storage medium of claim 16, wherein the one or more programs further include instructions for:

while the list of items includes the first new item in the fourth category, detecting, via the one or more input devices, a first request to remove the first new item from the fourth category; and in response to detecting the first request to remove the first new item from the fourth category and in accordance with a determination that the fourth category does not include an additional item assigned to the fourth category other than the first new item, updating display of, via the display generation component, the list of items to not include the fourth category.

23. The non-transitory computer-readable storage medium of claim 16, wherein the one or more programs further include instructions for:

while the list of items includes the first new item in the fourth category, detecting, via the one or more input devices, a second request to remove the first new item from the fourth category; and in response to detecting the second request to remove the first new item from the fourth category and in accordance with a determination that the fourth category does not include an additional item assigned to the fourth category other than the first new item, updating display of, via the display generation component, the list of items to include the fourth category without the first new item.

24. The non-transitory computer-readable storage medium of claim 16, wherein the one or more programs further include instructions for:

while displaying the list of items including the one or more items assigned to the first category and the one or more items assigned to the second category, detecting, via the one or more input devices, an eighth set of one or more inputs corresponding to a request to move a position of the first category with respect to a position of the second category; and while detecting at least a portion of the eighth set of one or more inputs, updating display of, via the display generation component, the list of items to not include the one or more items assigned to the first category.

25. The non-transitory computer-readable storage medium of claim 16, wherein the one or more programs further include instructions for:

while displaying the list of items with the one or more items assigned to the first category and the one or more items assigned to the second category, detecting, via the one or more input devices, a ninth set of one or more inputs corresponding to input of a set of one or more characters in a fourth text entry field;

in response to detecting the ninth set of one or more inputs and in accordance with a determination that the set of one or more characters corresponds to a previous item that was previously included in the list of items, displaying, via the display generation component, a representation of the previous item;

while displaying the representation of the previous item, detecting, via the one or more input devices, a tenth set of one or more inputs corresponding to selection of the representation of the previous item; and in response to detecting the tenth set of one or more inputs, updating display of, via the display generation component, the list of items to include the previous item, wherein display of the previous item in the list of items includes a graphical representation of the previous item.

26. The non-transitory computer-readable storage medium of claim 16, wherein the list of items includes a fifth text entry field positioned adjacent to a respective category, and wherein the one or more programs further include instructions for:

while displaying, via the display generation component, the list of items, detecting, via the one or more input devices, an eleventh set of one or more inputs corresponding to a request to add a second new item, different from the first new item, to the list of items, wherein the eleventh set of one or more inputs corresponds to the fifth text entry field; and in response to detecting the eleventh set of one or more inputs:

in accordance with a determination that the second new item corresponds to the first category, updating display of, via the display generation component, the list of items to include the second new item in the first category; and in accordance with a determination that the second new item corresponds to the second category, updating display of, via the display generation component, the list of items to include the second new item in the second category.

27. The non-transitory computer-readable storage medium of claim 26, wherein the one or more programs further include instructions for:

while displaying, via the display generation component, the list of items and before detecting the eleventh set of one or more inputs:

displaying, via the display generation component, a control to add a new item to the list of items; and while displaying the control to add a new item to the list of items, detecting, via the one or more input devices, an input directed to the control to add a new item to the list of items; and in response to detecting the input directed to the control to add a new item to the list of items, focusing input to the fifth text entry field, such that one or more characters detected, via the one or more input devices, while focusing input to the fifth text entry field, are added to the fifth text entry field, wherein the eleventh set of one or more inputs includes one or more inputs corresponding to selection of one or more characters to be added to the fifth text entry field.

28. The non-transitory computer-readable storage medium of claim 16, wherein the one or more programs further include instructions for:

while the list of items, including the one or more items assigned to the first category and the one or more items assigned to the second category, is in a first order, detecting, via the one or more input devices, a first input corresponding to a first request to reorder the list of items; and in response to detecting the first input corresponding to the first request to reorder the list of items, displaying, via the display generation component, the list of items such that the one or more items assigned to the first category and the one or more items assigned to the second category are in a second order different from the first order.

29. The non-transitory computer-readable storage medium of claim 28, wherein the one or more programs further include instructions for:

while the list of items, including the one or more items assigned to the first category and the one or more items assigned to the second category, is in the second order, detecting, via the one or more input devices, a second input corresponding to a second request to reorder the list of items; and in response to detecting the second input corresponding to the second request to reorder the list of items, displaying, via the display generation component, the list of items such that the one or more items assigned to the first category and the one or more items assigned to the second category are in a third order different from the second order, wherein the third order corresponds to an order based on categories of items.

30. The non-transitory computer-readable storage medium of claim 16, wherein the one or more programs further include instructions for:

while displaying the list of items, detecting, via the one or more input devices, a request to add a third new item to the list of items;

in response to detecting the request to add the third new item:

in accordance with a determination that the list of items is a shared list, that the list of items is subject to a first set of rules of a first external computer system, and that the third new item corresponds to a fifth category according to the first set of rules, updating display of, via the one or more display generation components, the list of items to include the third new item in the fifth category; and in accordance with a determination that the list of items is a shared list, that the list of items is subject to a second set of rules of a second external computer system different from the first external computer system, and that the third new item corresponds to a sixth category according to the second set of rules, updating display of, via the one or more display generation components, the list of items to include the third new item in the sixth category, wherein the sixth category is different from the fifth category.

31. A method, comprising:

at a computer system that is in communication with a display generation component and one or more input devices:

displaying, via the display generation component, a list of items, wherein the list of items includes:

one or more items assigned to a first category; and one or more items assigned to a second category different from the first category;

while displaying, via the display generation component, the list of items, detecting, via the one or more input devices, a first set of one or more inputs corresponding to a request to add a first new item to a third category;

in response to detecting the first set of one or more inputs:

updating display of, via the display generation component, the list of items to include the first new item in the third category; and in accordance with a determination that a first set of one or more criteria is satisfied, displaying, via the display generation component, a control corresponding to the first new item;

while displaying the control corresponding to the first new item, detecting, via the one or more input devices, a second set of one or more inputs corresponding to selection of the control; and in response to detecting the second set of one or more inputs, updating display of, via the display generation component, the list of items to include the first new item in a fourth category different from the third category without including the first new item in the third category.

32. The method of claim 31, wherein displaying the list of items includes displaying a first field that corresponds to the third category, the method further comprising:

in response to detecting at least a portion of the first set of one or more inputs, displaying, via the display generation component, a representation of the first new item in the first field that corresponds to the third category.

33. The method of claim 31, further comprising:

while displaying the control corresponding to the first new item, detecting, via the one or input devices, a third set of one or more inputs that corresponds to a request to cease displaying the list of items;

in response to detecting the third set of one or more inputs, ceasing display of, via the display generation component, the list of items;

after ceasing display of the list of items and while the list of items is not displayed, detecting, via the one or more input devices, a fourth set of one or more inputs corresponding to a request to display the list of items; and in response to detecting the fourth set of one or more inputs, displaying, via the display generation component, the list of items without displaying the control corresponding to the first new item.

34. The method of claim 31, wherein displaying the list of items includes displaying a collapse element that corresponds to the first category, the method further comprising:

while displaying the list of items including the one or more items assigned to the first category and the one or more items assigned to the second category, detecting, via the one or more input devices, a fifth set of one or more inputs corresponding to selection of the collapse element; and in response to detecting the fifth set of one or more inputs, updating display of, via the display generation component, the list of items to not include the one or more items assigned to the first category.

35. The method of claim 31, further comprising:

while the list of items includes the first new item in the fourth category, detecting, via the one or more input devices, a sixth set of one or more inputs corresponding to selection of the first new item of the fourth category; and in response to detecting the sixth set of one or more inputs, updating display of, via the display generation component, the list of items to not include the first new item in the fourth category.

36. The method of claim 31, further comprising:
while the list of items includes the first new item in the fourth category, detecting, via the one or more input devices, a seventh set of one or more inputs corresponding to selection of the first new item; and
in response to detecting the seventh set of one or more inputs, displaying, via the display generation component, an indicator at one or more locations corresponding to the first new item.

37. The method of claim 31, further comprising:
while the list of items includes the first new item in the fourth category, detecting, via the one or more input devices, a first request to remove the first new item from the fourth category; and
in response to detecting the first request to remove the first new item from the fourth category and in accordance with a determination that the fourth category does not include an additional item assigned to the fourth category other than the first new item, updating display of, via the display generation component, the list of items to not include the fourth category.

38. The method of claim 31, further comprising:
while the list of items includes the first new item in the fourth category, detecting, via the one or more input devices, a second request to remove the first new item from the fourth category; and
in response to detecting the second request to remove the first new item from the fourth category and in accordance with a determination that the fourth category does not include an additional item assigned to the fourth category other than the first new item, updating display of, via the display generation component, the list of items to include the fourth category without the first new item.

39. The method of claim 31, further comprising:
while displaying the list of items including the one or more items assigned to the first category and the one or more items assigned to the second category, detecting, via the one or more input devices, an eighth set of one or more inputs corresponding to a request to move a position of the first category with respect to a position of the second category; and
while detecting at least a portion of the eighth set of one or more inputs, updating display of, via the display generation component, the list of items to not include the one or more items assigned to the first category.

40. The method of claim 31, further comprising:
while displaying the list of items with the one or more items assigned to the first category and the one or more items assigned to the second category, detecting, via the one or more input devices, a ninth set of one or more inputs corresponding to input of a set of one or more characters in a fourth text entry field;
in response to detecting the ninth set of one or more inputs and in accordance with a determination that the set of one or more characters corresponds to a previous item that was previously included in the list of items, displaying, via the display generation component, a representation of the previous item;
while displaying the representation of the previous item, detecting, via the one or more input devices, a tenth set of one or more inputs corresponding to selection of the representation of the previous item; and
in response to detecting the tenth set of one or more inputs, updating display of, via the display generation component, the list of items to include the previous item, wherein display of the previous item in the list of items includes a graphical representation of the previous item.

41. The method of claim 31, wherein the list of items includes a fifth text entry field positioned adjacent to a respective category, the method further comprising:
while displaying, via the display generation component, the list of items, detecting, via the one or more input devices, an eleventh set of one or more inputs corresponding to a request to add a second new item, different from the first new item, to the list of items, wherein the eleventh set of one or more inputs corresponds to the fifth text entry field; and
in response to detecting the eleventh set of one or more inputs:
in accordance with a determination that the second new item corresponds to the first category, updating display of, via the display generation component, the list of items to include the second new item in the first category; and
in accordance with a determination that the second new item corresponds to the second category, updating display of, via the display generation component, the list of items to include the second new item in the second category.

42. The method of claim 41, further comprising:
while displaying, via the display generation component, the list of items and before detecting the eleventh set of one or more inputs:
displaying, via the display generation component, a control to add a new item to the list of items; and
while displaying the control to add a new item to the list of items, detecting, via the one or more input devices, an input directed to the control to add a new item to the list of items; and
in response to detecting the input directed to the control to add a new item to the list of items, focusing input to the fifth text entry field, such that one or more characters detected, via the one or more input devices, while focusing input to the fifth text entry field, are added to the fifth text entry field, wherein the eleventh set of one or more inputs includes one or more inputs corresponding to selection of one or more characters to be added to the fifth text entry field.

43. The method of claim 31, further comprising:
while the list of items, including the one or more items assigned to the first category and the one or more items assigned to the second category, is in a first order, detecting, via the one or more input devices, a first input corresponding to a first request to reorder the list of items; and
in response to detecting the first input corresponding to the first request to reorder the list of items, displaying, via the display generation component, the list of items such that the one or more items assigned to the first category and the one or more items assigned to the second category are in a second order different from the first order.

44. The method of claim 43, further comprising:
while the list of items, including the one or more items assigned to the first category and the one or more items assigned to the second category, is in the second order, detecting, via the one or more input devices, a second input corresponding to a second request to reorder the list of items; and
in response to detecting the second input corresponding to the second request to reorder the list of items, displaying, via the display generation component, the list of items such that the one or more items assigned to the first category and the one or more items assigned to the second category are in a third order different from the second order, wherein the third order corresponds to an order based on categories of items.

45. The method of claim 31, further comprising:

while displaying the list of items, detecting, via the one or more input devices, a request to add a third new item to the list of items;

in response to detecting the request to add the third new item:

in accordance with a determination that the list of items is a shared list, that the list of items is subject to a first set of rules of a first external computer system, and that the third new item corresponds to a fifth category according to the first set of rules, updating display of, via the one or more display generation components, the list of items to include the third new item in the fifth category; and in accordance with a determination that the list of items is a shared list, that the list of items is subject to a second set of rules of a second external computer system different from the first external computer system, and that the third new item corresponds to a sixth category according to the second set of rules, updating display of, via the one or more display generation components, the list of items to include the third new item in the sixth category, wherein the sixth category is different from the fifth category.

* * * * *